US010044616B2

(12) United States Patent
Sajeepa et al.

(10) Patent No.: US 10,044,616 B2
(45) Date of Patent: *Aug. 7, 2018

(54) CO-EXISTENCE OF ROUTABLE AND NON-ROUTABLE RDMA SOLUTIONS ON THE SAME NETWORK INTERFACE

(71) Applicant: Cisco Technology, Inc., San Jose, CA (US)

(72) Inventors: Prabhath Sajeepa, San Jose, CA (US); Rushikesh Shree Khasgiwale, Fremont, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/795,662

(22) Filed: Oct. 27, 2017

(65) Prior Publication Data

US 2018/0048569 A1 Feb. 15, 2018

Related U.S. Application Data

(63) Continuation of application No. 14/965,722, filed on Dec. 10, 2015, now Pat. No. 9,813,338.

(51) Int. Cl.
*H04L 12/781* (2013.01)
*G06F 15/17* (2006.01)
(Continued)

(52) U.S. Cl.
CPC ...... *H04L 45/745* (2013.01); *G06F 15/17331* (2013.01); *H04L 45/66* (2013.01);
(Continued)

(58) Field of Classification Search
CPC ..... H04L 69/18; H04L 69/324; H04L 69/325; G06F 15/17331
See application file for complete search history.

(56) References Cited

U.S. PATENT DOCUMENTS 9,813,338 B2 11/2017 Sajeepa et al.
2004/0190533 A1 9/2004 Modi et al.
(Continued)

OTHER PUBLICATIONS

Author Unknown, "InfiniBand Architecture Specification vol. 1," InfiniBand Trade Association, Release 1.1, Nov. 6, 2002, 1303 pages.
(Continued)

*Primary Examiner* — Hoon J Chung
(74) *Attorney, Agent, or Firm* — Polsinelli PC

(57) ABSTRACT

An example method for simultaneously supporting, on a single VIC adapter (i.e. on a single network interface), RDMA transport according to multiple RoCE versions is disclosed. The method includes providing the VIC adapter with an indication of a RoCE version used for a particular RDMA connection between two compute nodes identified by a certain QP identifier, and then automatically configuring Egress (EG) packet classifier and flow table of the VIC adapter to encapsulate outgoing RDMA commands and automatically configuring Ingress (IG) packet classifier and flow table of the VIC adapter to decapsulate incoming RoCE packets for that RDMA connection according to the indicated RoCE version. Automatic encapsulation and decapsulation according to any one of the multiple RoCE versions that may be used for a particular RDMA connection, i.e. on a per-QP basis, advantageously allows co-existence of routable (i.e. RoCEv2) and non-routable (i.e. RoCEv1) RDMA solutions on a single network interface.

20 Claims, 12 Drawing Sheets

(51) Int. Cl.
*H04L 12/741* (2013.01)
*G06F 15/173* (2006.01)
*H04L 29/08* (2006.01)
*H04L 12/721* (2013.01)
*H04L 29/06* (2006.01)

(52) U.S. Cl.
CPC ............ *H04L 69/18* (2013.01); *H04L 69/324* (2013.01); *H04L 69/325* (2013.01); *H04L 69/322* (2013.01)

(56) References Cited

U.S. PATENT DOCUMENTS

2005/0108518 A1  5/2005  Pandya
2016/0188527 A1  6/2016  Cherian et al.

OTHER PUBLICATIONS

Author Unknown, "RDMA Aware Networks Programming User Manual," Rev. 1.7, Mellanox Technologies, Copyright 2015, 216 pages.

IG packet classifier match criteria
502

IG PKT Classifier Action
504

| Entry | UIF | Ethtype [12] | GRH Ver [14] | GRH opcode [20] | BTH opcode [54] | Padcnt + BTH ver [55] | QP [59] | Action |
|---|---|---|---|---|---|---|---|---|
| RDMA Write First | - | 8915 | 60 | 1b | 06 | 00 | 000--- | FlowTable |

FIG. 5A

| Entry | UIF | Ethtype [12] | IP Proto [24] | Destination Port [36] | BTH opcode [42] | Padcnt + BTH ver [43] | QP [47] | Action |
|---|---|---|---|---|---|---|---|---|
| RDMA Write First | - | 0800 | 11 | 12B7 | 06 | 00 | 000--- | FlowTable |

FIG. 5B

| Word\Byte | 3 | 2 | 1 | 0 |
|---|---|---|---|---|
| 0 | RoCE Version=1 | Receive Queue Number | Source QP | |
| 1 | Reserved | | Destination QP | |
| 2 | | Receive Queue Number | | |
| 3 | | Protection Domain | | |
| 4 | | Remote MAC(0-3) | | |
| 5 | MSS | | Remote MAC(4-5) | |

FIG. 8A

| Word\Byte | 3 | 2 | 1 | 0 |
|---|---|---|---|---|
| 0 | RoCE Version=2 | | Source QP | |
| 1 | Reserved | | Destination QP | |
| 2 | | Receive Queue Number | | |
| 3 | | Protection Domain | | |
| 4 | | Remote MAC(0-3) | | |
| 5 | MSS | | Remote MAC(4-5) | |
| 6 | Source IPv4 address | | | |
| 7 | Remote IPv4 address | | | |

CO-EXISTENCE OF ROUTABLE AND NON-ROUTABLE RDMA SOLUTIONS ON THE SAME NETWORK INTERFACE

CROSS REFERENCE TO RELATED APPLICATION

This application is a continuation of U.S. patent application Ser. No. 14/965,722, filed on Dec. 10, 2015 (allowed), which is expressly incorporated by reference herein in its entirety.

TECHNICAL FIELD

This disclosure relates in general to the field of communications and, more particularly, to co-existence of routable and non-routable remote direct memory access (RDMA) solutions on a single network interface.

BACKGROUND

A typical enterprise network, which can include data centers, contains myriad network elements, including hosts, load balancers, routers, switches, etc. The network connecting the network elements provides secure user access to various services and an infrastructure for deployment, interconnection, and aggregation of shared resource as required, including applications, hosts, appliances, and storage. Improving operational efficiency and optimizing utilization of resources in such networks are some of the challenges facing network operators. Network operators want a resilient infrastructure that consistently supports diverse applications and services and protects the applications and services against disruptions. The application workloads deployed in a typical datacenter can have varying level of latency and bandwidth requirements, which have to be supported by the network infrastructure. A properly planned and operating network provides application and data integrity and optimizes application availability and performance.

Remote Direct Memory Access (RDMA) technology enables data transfers between compute nodes with minimal central processing unit (CPU) overhead and low latency. Because of this virtue, RDMA deployments are becoming popular in modern enterprise networks.

RDMA over Converged Ethernet (RoCE) is a network protocol that allows RDMA transport over an Ethernet network. Currently two RoCE version exist, namely RoCE v1 and RoCE v2. RoCE v1 is a link layer protocol, i.e. a protocol that only operates on a link that a host is physically connected to, and hence allows communication between any two hosts in the same Ethernet broadcast domain, which means that RoCE v1 packets can only be switched but not routed and that RoCE v1 is an example of a non-routable RDMA solution. RoCE v2 is an internet layer protocol, i.e. a protocol that allows to transport packets across network boundaries, which means that RoCE v2 packets can be routed and that RoCE v2 is an example of a routable RDMA solution. Improvements in RDMA implementations, in particular with respect to deployment of RoCE v1 and RoCE v2 transport solutions, are always desirable.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIGS. 5A and 5B illustrate exemplary IG packet classifier entries for RDMA WRITE FIRST packets for, respectively, RoCE v1 and RoCE v2 modes, according to some embodiments of the present disclosure;

FIGS. 8A and 8B illustrate exemplary VIC adapter mailbox commands for instructing creation of a QP in, respectively, RoCE v1 and RoCE v2, according to some embodiments of the present disclosure;

DETAILED DESCRIPTION OF EXAMPLE EMBODIMENTS

Overview

Figure 1:
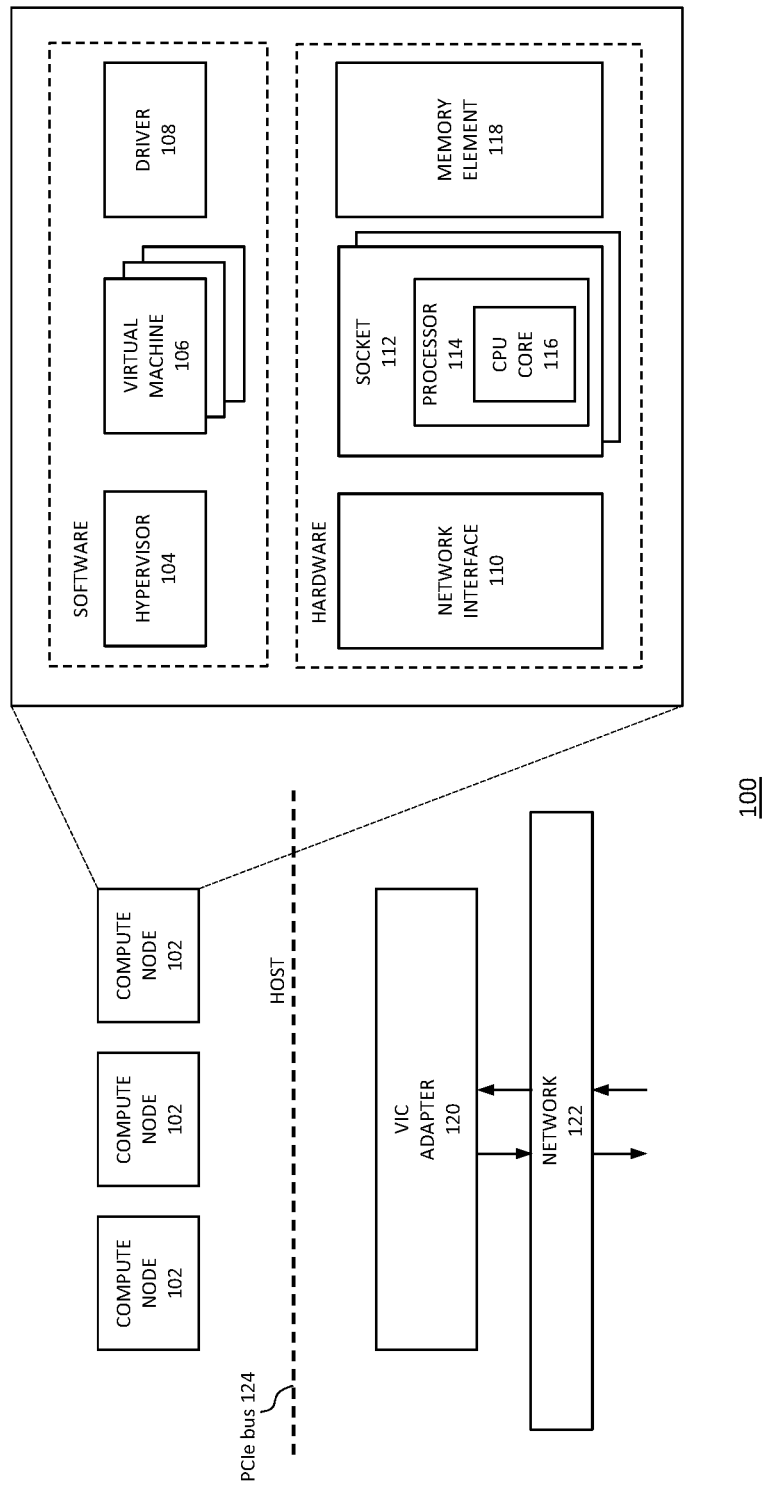
FIG. 1 is a simplified block diagram illustrating a communication system for facilitating co-existence of routable and non-routable RDMA solutions on a single network interface in accordance with one example embodiment.

One aspect of the present disclosure provides a computer-implemented method for simultaneously supporting, on a single virtual interface card (VIC) adapter of a host compute node, RDMA transport according to at least two different RoCE protocol versions—RoCE v1 and RoCE v2. Such a method may be referred to as a "RoCE combination method," highlighting the fact that the method enables co-existence, i.e. simultaneous implementation, of RDMA solutions according to different RoCE versions on the same network interface of the host compute node.

In context of the present disclosure, RDMA transport refers to exchange of packets over an RDMA connection between the host compute node and another compute node, referred to herein as a "target compute node," which may or may not be in the same Ethernet domain as the host compute node. Various descriptions provided herein are presented from the perspective of the compute node that is referred to as a "host," a "host compute node," a "source." Such a compute node may also be referred to as a "local node" or a "local peer" of an RDMA connection between that compute node and the other, target, compute node. In the following, any of the terms host, source, and local, or any combination of these terms, refer to the host compute node and elements associated with it (e.g. VIC adapter associated with it). The target compute node may also be referred to as a "target," a "destination," or as a "remote node" or a "remote peer" of that RDMA connection. In the following, any of the terms host, source, and local, or any combination of these terms, refer to the host compute node and other components or elements associated with it, while any of the terms target, destination, and remote, or any combination of these terms, refer to the target compute node and other components or elements associated with it. The other components and elements associated with a compute node include e.g. a VIC adapter (also referred to as a network interface or a channel adapter) and a driver for a network interface. For example, a VIC adapter of a host compute node is conventionally referred to as a host VIC adapter, or a Host Channel Adapter (HCA) when the VIC adapter is considered to be a single entity with the corresponding host driver, while a VIC adapter of a target compute node is conventionally referred to, similarly, as a target VIC adapter or a Target Channel Adapter (TCA).

Similarly, terms indicating direction of RDMA transport such as outgoing, incoming, egress, or ingress also indicate direction from the perspective of the host compute node and/or from the perspective of entities, such as e.g. VIC adapter and driver that are associated with the host compute node. For the other side of the connection, i.e. the side of the target compute node, these terms would be reversed, e.g. a packet that is an outgoing packet for the host compute node is an incoming packet for the target compute node, in context of the RDMA connection between the host and target compute nodes.

In one embodiment of the present disclosure, the RoCE combination method includes receiving, at the host VIC adapter, from the host driver, an indication of a RoCE version, out of the at least two RoCE versions (e.g. RoCE v1 and RoCE v2), used for an RDMA connection between the host compute node and the target compute node. The host driver and/or the host VIC adapter identify the RDMA connection between the host and target compute nodes by a first Queue Pair (QP) identification (ID). The method further includes automatically (i.e. without user intervention and without re-starting or re-booting the host VIC adapter or/and the host driver) programming an Egress (EG) packet classifier and an EG flow table of the host VIC adapter. Together, the EG packet classifier and flow table are configured to facilitate encapsulation of outgoing RDMA commands for different QPs, i.e. for different RDMA connections, that involve the host compute node. Programming the EG packet classifier and flow table of the host VIC adapter includes programming them to encapsulate outgoing RDMA commands for the connection identified by the first QP ID according to the RoCE version indicated for the connection identified by the first QP ID. The method also includes automatically programming an Ingress (IG) packet classifier and an IG flow table of the host VIC adapter, together configured to decapsulate incoming RDMA packets for different QPs, to decapsulate incoming RDMA packets for the connection identified by the first QP ID according to the RoCE version indicated for the connection identified by the first QP ID.

In general, "encapsulation" refers to addition of appropriate headers to a packet while "decapsulation" refers to extraction of payload data from a packet by decoding the headers. As used herein, "encapsulation" refers to packetizing, i.e. creating packets from, outgoing RDMA commands that originate from the host and are received at the EG classifier of the host VIC adapter by including one or more outgoing RDMA commands as payload data of one or more RoCE packets destined for the target. On the other hand, as used herein, "decapsulation" refers to de-packetizing incoming RoCE packets that originate from the target and are destined for the host, and are received at the IG classifier of the host VIC adapter by extracting from the incoming RoCE packets RDMA work requests or responses included as payload of these packets.

It should be noted that although RoCE protocols benefit from the characteristics of a converged Ethernet network, embodiments described herein are also applicable to using these protocols on traditional or non-converged Ethernet networks.

The RoCE combination method described above may be summarized as a method for simultaneously supporting, on a single VIC adapter (i.e. on a single network interface), RDMA transport according to multiple RoCE versions, by providing the VIC adapter with an indication of a particular RoCE version used for a particular RDMA connection between two compute nodes identified by a certain QP ID, and then automatically configuring the EG packet classifier, EG flow table of the VIC adapter and associated microcode routines to encapsulate outgoing RDMA commands and automatically configuring the IG packet classifier, IG flow table and associated microcode routines of the VIC adapter to decapsulate incoming RoCE packets for that RDMA connection according to the particular RoCE version used. Automatic encapsulation and decapsulation according to any one of the multiple RoCE versions that may be used for a particular RDMA connection, i.e. on a per-QP basis, advantageously allows co-existence (i.e. simultaneous implementation) of routable (i.e. RoCE v2) and non-routable (i.e. RoCE v1) RDMA solutions on a single network interface.

Proposed approach may facilitate adaptation of routable RDMA solutions by allowing dynamic and automatic reconfiguration of a network interface to support RDMA transport for a particular RDMA connection based on whether that particular RDMA connection is established according to a conventional, non-routable protocol (i.e. RoCE v1) or according to a more recent, routable, protocol (i.e. RoCE v2).

Embodiments of the RoCE combination method described herein could be implemented by a functional entity referred to herein as a "RoCE combination logic." Various parts of the method could be implemented by a VIC adapter of a compute node or any other network element associated with and/or communicatively coupled to the VIC adapter. Therefore, in various embodiments, the RoCE combination logic, or part thereof, could be implemented within any of these network elements or/and distributed among a plurality of network elements.

As used herein, the term "compute node" refers to a hardware apparatus or a virtual machine, in which one or more applications (e.g., software programs), e.g. user applications, are executed, and which provides processing, memory, network and/or storage resources.

As will be appreciated by one of ordinary skill in the art, aspects of the present disclosure, in particular the functionality related to the RoCE combination described herein, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded to the existing devices and systems (e.g. to the existing network elements such as the existing VIC adapters and various control nodes) or be stored upon manufacturing of these devices and systems.

Example Embodiments

Wide variety of distributed systems and applications use RDMA as primary interface for transport. For example, data center storage technologies have seen great performance improvements by using RDMA as transport protocol.

As previously described herein, RoCE is a network protocol that allows RDMA transport over an Ethernet network (although also applicable to non-converged Ethernet networks) and, currently, there are two implementations of RoCE, namely RoCE v1 and RoCE v2. RoCE v1 is a non-routable protocol that operates at the link layer and require that HCA and TCA are in same Ethernet switching domain. On the other hand, RoCE v2 is a routable protocol, where RDMA work requests and responses are encapsulated in User Datagram Protocol (UDP) and Internet Protocol (IP) packets.

Besides the ability to route RoCE v2 packets, the RoCE v2 traffic can take advantage of Equal-Cost Multiple-Path (ECMP) load balancing which could improve overall throughput when there are multiple paths between various network elements.

Routable RDMA solutions, i.e. RoCE v2-based solutions, are more recent compared to non-routable RDMA solutions, and are quickly gaining popularity in data center deployments because they extend the reach of RDMA capable storage and compute nodes beyond a single Ethernet switching domain. Therefore, some vendors have developed support for both RoCE v1 and v2 protocols in their VIC adapters. However, such VIC adapters have a drawback in that a user is required to configure/choose support for either RoCE v1 or RoCE v2 statically. When a user switches the VIC adapter from RoCE v1 to RoCE v2 or vice versa, the VIC adapter needs to be rebooted for the change to take effect. Another drawback is that such VIC adapters can operate only in one mode (either RoCE v1 or RoCE v2) at any particular time and that mode of operation applies to all Queue Pairs created on that interface.

The drawbacks described above become especially exacerbated in large scale deployments, e.g. in large scale datacenters that could include some compute nodes that can operate only in RoCE v1 or RoCE v2 mode, but not in both modes. In such situations, for a given RDMA capable interface, there may be a need to establish RoCE v1 connections between some nodes and RoCE v2 connections between other nodes. Furthermore, operating RoCE at Layer 3 (L3), i.e. in the routable version, requires preserving lossless characteristics across L3 routers that connect different broadcast domains, which requires additional configuration on the routers. Manual and static configuration of VIC adapters becomes, therefore, too costly and unacceptable.

Combined RoCE method described herein improves on at least some of the drawbacks described above by proposing an approach where both RoCE v1 and v2 may be supported on the same network interface at the same time and where the operating mode, i.e. either RoCE v1 or RoCE v2 based RDMA transport, is decided dynamically based on the capability of the target node.

The InfiniBand™ Architecture Specification, an example of which is InfiniBand™ Architecture Specification Volume 1 Release 1.2.1 (in the following: InfiniBand™ Specification), the description of which is included herein in its' entirety, has defined several types of RDMA services that are available for the consumers. One of them is a "reliable service", which provides a guarantee that messages are delivered from a Requestor network element to a Responder network element in order and without corruption. A sub-type of reliable service which is most commonly used is "Reliable Connection" (RC), where end points exchange their capabilities at the beginning and establish a dedicated connection. An entity called Queue Pair (QP) is associated with the connection between the end points, i.e. host and target compute nodes, and provides an interface to send RDMA commands and receive RDMA packets carrying data. For illustrative purposes, various embodiments are described herein in context of an RC transport interface of RDMA. However, these embodiments are equally applicable, with modifications that would be apparent to a person of ordinary skill in the art based on the teachings provided herein, to other transport types as well, such as e.g. Reliable Datagram (RD).

The following section provides a general explanation of RDMA implementation on a VIC adapter.

Turning to FIG. 1, FIG. 1 is a simplified block diagram illustrating a communication system 100 for facilitating co-existence of routable and non-routable RDMA solutions on a single network interface in accordance with one example embodiment. The communication system 100 includes a plurality of compute nodes 102 that provide processing, memory, network and/or storage resources to run instances of various user applications, virtual machines, etc. Such compute nodes are sometimes, interchangeably, referred to as hosts or requestors/responders, to indicate that actions described herein as being performed by compute nodes can be performed either by hardware devices or systems or by software running on such hardware devices or systems.

In a general sense, compute nodes 102 comprise (e.g., include, hold, contain, run, host, etc.) computing resources that can carry out various processing, memory, network and/or storage functions. For example, as shown in FIG. 1 with an inset for the right-most compute node 102, a compute node may run a hypervisor 104 (including its associated driver), various virtual machine instances 106, and can have one or more network interfaces 110 that enable network connectivity according to a network driver 108.

The term "driver" is typically used to describe any type of system software used to drive hardware. The network driver 108 may comprise a software implementation of network protocols, such as Ethernet, RoCE, etc. and can be controlled by an operating system of the compute node 102 to communicate over the network interface 108).

Although shown as a separate element in FIG. 1, in various embodiments the network driver 108 may also execute inside an associated one of virtual machine instances 106 and/or be a part of or communicatively connected to a VIC adapter 120. In addition, although shown to be included within the compute node 102, in other embodiments the network driver 108 may be implemented separately from (i.e. not be included within) but be associated with (e.g. communicatively connected to and configured to operate with) a compute node 102. In the following, the network driver 108 is sometimes referred to as a "host driver" to indicate that it is associated with, and may or may not be included within a host compute node.

In various embodiments, each of the compute nodes 102 may further contain one or more sockets 112 (e.g., socket refers to a hardware receptacle that enables a collection of CPU cores with a direct pipe to memory), each socket holding at least one processor 114, each processor comprising one or more Central Processing Unit (CPU) cores 116, each CPU core executing instructions (e.g., computations, such as Floating-point Operations Per Second (FLOPS)). Each of the compute nodes 102 may also include a memory element 118 which may store data and facilitate operations of CPU cores 116.

The VIC adapter 120 shown in FIG. 1 is configured to facilitate communication to and from each of the compute nodes 102, either between each other or with other compute nodes communicatively connected over a network 122. The latter computer nodes are not shown in FIG. 1, but it may be envisioned that such compute nodes are provided in a configuration analogous to that shown in FIG. 1 for one side of the network 122 (i.e. if the architecture of FIG. 1 was mirrored with respect to the network 122). Although FIG. 1 illustrates a common VIC adapter for multiple compute nodes 102, in other embodiments, multiple VIC adapters may be implemented, either as an individual VIC adapter per compute node or a VIC adapter per a subset of compute nodes.

In a general sense, network traffic between compute nodes 102 and the network 122 (i.e. traffic between the compute nodes 102 shown in FIG. 1 and compute nodes which may be connected on the other side of the network 122) may be termed as "North-South Traffic", while network traffic among compute nodes 102 shown in FIG. 1 may be termed as "East-West Traffic". Note that compute nodes in communication with one another may be, and typically are, unaware of the physical location of other compute nodes, for example whether they exist in the same local network, or are in another network, connected over the network 122. Thus, compute nodes described herein are agnostic to the direction of network traffic they originate or terminate, such as whether the traffic is North-South or East-West. Irrespective of the direction of the network traffic, the VIC adapter 120 presents a uniform interface to compute nodes for both North-South traffic and East-West traffic.

A Peripheral Component Interconnect Express (PCIe) bus 124 may facilitate communication between the VIC adapter 120 and one or more VIC host drivers 108. To that end, the VIC adapter 120 may create a virtual Network Interface Card (vNIC) (not shown in FIG. 1) that can be associated with a specific host driver 108 and an application executing in one of the compute node 102. Each host driver 108 may comprise an RDMA engine for managing RDMA related operations.

The VIC adapter 120 is a PCIe based Converged Network Adapter (CNA) deployed on certain blade and rack servers in a network environment. The VIC adapter provides high speed (e.g., 10G/40G) input/output (I/O) interfaces (e.g., VNICs) for network and storage traffic. While greater details regarding the VIC adapter 120 are provided below with reference to FIG. 2, in general, such VIC adapters can enable RDMA functionality by supporting packet classification and dynamic modification of packet headers. The VIC adapter has packet processors that can execute microcode routines at ingress/egress for substantially every packet. The microcode routines perform various RDMA functions, such as Direct Memory Access (DMA) of ingress data directly into host memory based on a virtual address mentioned in a packet header, inserting/deleting RDMA transport and link layer headers and performing packet checks for sequence number and Cyclic Redundancy Check (CRC).

For purposes of illustrating the techniques of the communication system 100, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Direct memory access (DMA) is an ability of a device to access local host memory directly, without the intervention of any CPU(s). RDMA is the ability of accessing (e.g., reading from or writing to) memory on a remote machine without interrupting the processing of the CPU(s) on the remote machine. RDMA enables data transfers between the compute nodes 102 with minimal processor overhead and low latency. Hence, RDMA deployments are increasingly popular in modern data centers. RDMA is also being increasingly used in Hadoop™ and/or Big Data deployments, in which low latency is advantageous for Map Reduce and Remote Procedure Call (RPC) operations. Various distributed file systems like Ceph™ and GlusterFS™ can take advantage of RDMA for inter-node communication within a cluster of files. Windows® hypervisor prefers RDMA for live migration of virtual machines, as it is well-established that virtual machines can be migrated over RDMA enabled interconnects in short time with minimal processor utilization.

RDMA communication is based on a set of three queues: (i) a send queue and (ii) a receive queue, comprising a Queue Pair (QP) and (iii) a Completion Queue (CQ). Posts in the QP are used to initiate the sending or receiving of data. An application (e.g., driver) places instructions on its work queues that generate buffers in the VIC adapter to send or receive data. The instructions comprise structures called work requests or Work Queue Elements (WQEs) that include a pointer to the buffer (e.g., a WQE placed on the send queue contains a pointer to the message to be sent; a pointer in the WQE on the receive queue contains a pointer to a buffer where an incoming message can be placed). The VIC adapter consumes WQE from the send queue at the egress side and streams the data from the application buffers to the remote system. When data arrives at the remote system (i.e. at the TCA), the remote VIC adapter consumes the WQEs at the receive queue at the ingress side and places the received data in appropriate application buffer which could be represented by memory regions. In case of RDMA SEND/RECV, the VIC adapter uses the SEND/RECV operation to transfer control messages, which may or may not belong to any memory region. The SEND/RECV buffers are application provided buffers, comprising different memory spaces in adapter memory. RDMA can work over a network using RoCE, with encapsulation of RDMA primitives in Ethernet packets, such that the RDMA traffic is treated as any other Ethernet traffic.

Figure 2:
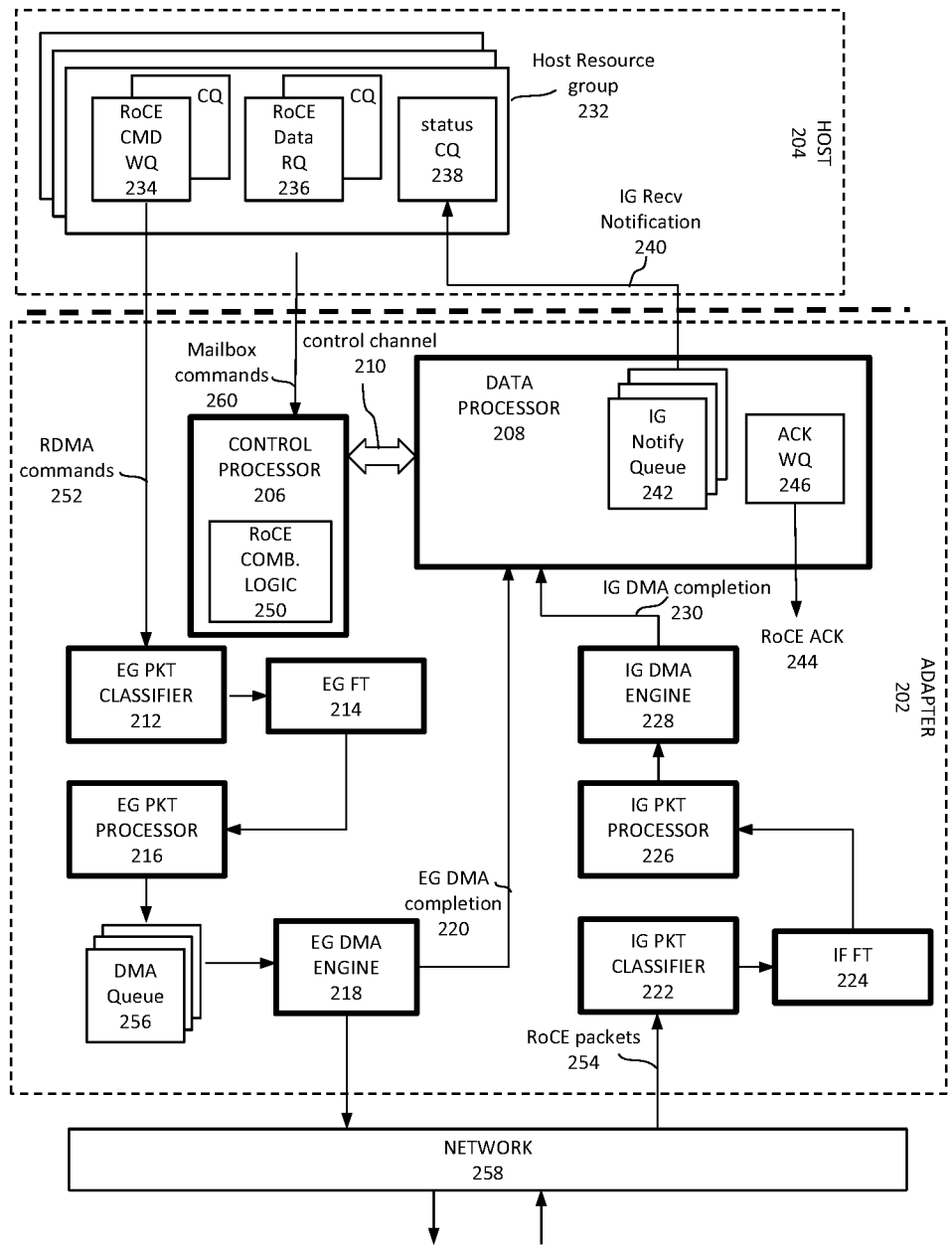
FIG. 2 is a simplified block diagram illustrating other example details of embodiments of the communication system of FIG. 1.

FIG. 2 is a simplified block diagram 200 illustrating functional blocks of a VIC adapter 202 configured to support RDMA transport. The VIC adapter 202 may be implemented as the VIC adapter 120 shown in FIG. 1. The system 200 shown in FIG. 2 is a more detailed illustration of an embodiment of the communication system 100 shown in FIG. 1. Therefore, all of the discussions provided with respect to FIG. 1 are applicable to the architecture show in FIG. 2.

The VIC adapter 202, typically implemented as a firmware and capable of supporting RDMA, creates various resources in hardware that are used to handle ingress and egress RDMA data flows. The virtual network interface card (vNIC) is associated with a group of hardware queues to receive commands from a host 204, handle incoming RDMA work requests, command completions, acknowledgements and other protocol related communications. In this context, the host 204 refers to e.g. one of the compute nodes 102 described above or an application on one of the compute nodes 102. In particular, each vNIC may be associated with PCIe end point on the compute node 102, represented by PCI identifier (Bus:Device:Function)

As shown in FIG. 2, the VIC adapter 202 includes a control processor 206, a data path processor 208, a control channel 210 between the control and data processors, an egress packet classifier 212, an ingress packet classifier 222, an egress flow table (FT) 214, an ingress flow table 224, an egress packet processor 216, an ingress packet processor 226, an egress DMA engine 218, an ingress DMA engine 228.

As also shown in FIG. 2, the host 204 includes a plurality of Host Resource Groups 232, each host resource group 232 comprising a RoCE command (CMD) Work Queue (WQ) 234, an RoCE Data Response Queue (RQ) 236, and a status Completion Queue (CQ) 238. Each resource group 232 represents hardware resources, such as e.g. resources 234, 236, and 238 shown in FIG. 2. A user can use specialized management software to indicate how many Resource Groups should be associated with a single network interface, such as e.g. network interface 110 (there could be multiple network interfaces 110 per physical VIC adapter). For example, if a user specifies that 4 Resource Groups are to be created for a given network interface, then the firmware will create 4 sets of hardware resources and associate them with the network interface. At this point, a host driver, such as the host driver 108, typically implemented as software running on the compute node 102, will be able to discover those hardware resources and will be able to make use of it, thus managing the network interface 110.

The control processor 206 is typically responsible for configuration of RDMA resources on behalf of a network interface, e.g. the network interface 110 shown in FIG. 1. To that end, the control processor 206 is configured to allocate Work Queues (WQs), Response Queues (RQs) and Completion Queues (CQs) to be used by the host driver, e.g. the host driver 108. The control processor is also configured to allocate memory of the adapter 202 (memory not individually shown in FIG. 2) and maps it to the host 204. The control processor 206 is also configured to invoke initialization of fast path structures used by the data path processors 208.

The data path processor 208 is configured to notify the host 204 after incoming data is placed, by DMA, into host memory (not shown in FIG. 2) for channel operations. This is illustrated in FIG. 2 with an Ingress (IG) Received (Recv) Notification 240 sent from an IG notify queue 242 to the status CQ 238 in the host 204.

The data path processor 208 is also configured to handle errors when the incoming packet does not follow proper protocol syntax or semantics.

The data path processor 208 is further configured to generate acknowledgement (ACK) packets for the incoming requests. This is illustrated in FIG. 2 with RoCE ACK 244 originating from a ACK WQ 246.

In order to implement RoCE combination methods as described herein, the VIC adapter 202 includes an RoCE combination logic 250, which could e.g. be implemented as a part of the control processor 206, as shown in FIG. 2. The RoCE combination logic 250 is configured to control functionality of the VIC adapter 202 by automatically programming the EG packet classifier 212, the EG FT 214, the IG packet classifier 222, and the IG FT 224 to function in accordance with a RoCE version used for each RDMA connection. To that end, depending on a RoCE version used for a particular RDMA connection, which connection is identified by a particular QP ID, the RoCE combination logic 250 configures the EG packet classifier 212 and the EG FT 214 to enable encapsulation of the outgoing RDMA commands for that particular RDMA connection in accordance with the RoCE version used for the connection. Furthermore, the RoCE combination logic 250 also configures the IG packet classifier 222 and the IG FT 224 to enable decapsulation of the incoming RoCE packets for that particular RDMA connection in accordance with the RoCE version used for the connection.

Figure 3:
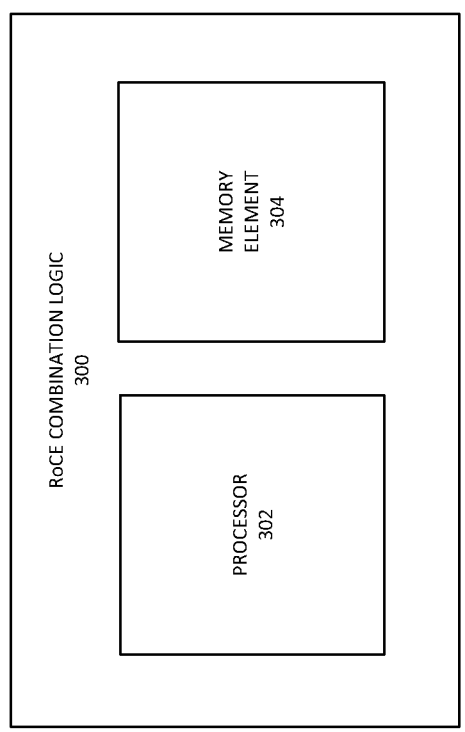
FIG. 3 illustrates a logical entity for assisting co-existence of routable and non-routable RDMA solutions on a single network interface, according to some embodiments of the present disclosure.

The RoCE combination logic 250 may be considered to include at least one processor and at least one memory element, as shown in FIG. 3, configured to facilitate various operations described herein. The processor may execute logic to support co-existence of routable and non-routable RDMA solutions on a single network interface, such as e.g. the network interface 110. In various embodiments, the logic 250 is configured to carry out the RoCE combination method described herein, or configured to ensure that such methods are used to encapsulate and decapsulate RDMA traffic. It should be noted that various repositories may be associated with the logic 250, not shown in FIG. 2. Furthermore, even though the logic 250 is illustrated in FIG. 2 as included within the control processor 206, in other embodiments, functionality of the logic 250 may be included in a different, separate network element or be distributed over a plurality of network elements, e.g. parts of the functionality of the logic 250 may be implemented in various elements of the VIC adapter 202, such as e.g. in the packet classifiers and flow tables.

In a general sense, the logic 250 may be implemented as a network element 300 shown in FIG. 3. The logical entity 300 may be considered to illustrate an exemplary internal structure associated with the logic 250, as well as with any other elements shown in FIG. 2, which is meant to encompass network appliances, servers, routers, switches, gateways, bridges, loadbalancers, firewalls, processors, modules, or any other suitable device, component, element, or object operable to exchange information that facilitates or otherwise helps to provide RoCE combination as described herein. In other embodiments, these operations and/or features may be provided external to these elements, or included in some other network device/element or a plurality of elements to achieve this intended functionality. Alternatively, one or more of these elements can include software (or reciprocating software) that can coordinate in order to achieve the operations and/or features, as outlined herein. In still other embodiments, one or more of these elements may include any suitable algorithms, hardware, software, components, modules, interfaces, or objects that facilitate the operations thereof. This may be inclusive of appropriate algorithms and communication protocols that allow for the effective exchange of data or information.

As shown in FIG. 3, the logic 300 may include at least one processor 302 and at least one memory element 304, along with any other suitable hardware and/or software to enable its intended functionality of RoCE combination as described herein. Similarly, each of the control processor 206, the classifiers 212 and 222, the FTs 214 and 224, the packet processors 216 and 226, and the DMA engines 218 and 228 may include memory elements for storing information to be used in achieving the RoCE combination operations as outlined herein, and a processor that can execute software or an algorithm to perform the RoCE combination activities as discussed in this Specification. Any of these devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term "memory element." The information being tracked or sent to the logic 250/300, the control processor 206, the classifiers 212 and 222, the FTs 214 and 224, the packet processors 216 and 226, and the DMA engines 218 and 228 could be provided in any database, register, control list, cache, or storage structure, all of which can be referenced at any suitable timeframe. Any such storage options may be included within the broad term "memory element" as used herein. Similarly, any of the potential processing elements, modules, and machines described herein should be construed as being encompassed within the broad term "processor." Each of the network elements and compute nodes can also include suitable interfaces for receiving, transmitting, and/or otherwise communicating data or information in a network environment.

Note that in certain example implementations, the RoCE combination mechanisms as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. memory 304 shown in FIG. 3, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. processor 302 shown in FIG. 3, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Returning back to FIG. 2, the egress and ingress packet classifiers 212 and 222 are configured to trap, respectively, outgoing RDMA commands 252 and incoming RoCE packets 254 (again, outgoing and incoming from the perspective of the host 204), which commands and packets may be according to e.g. RoCE v1 or RoCE v2 protocols, RoCE v2 protocol including RoCE over IPv6 protocol, depending on the configuration of the VIC adapter 202 for each particular QP. These classifiers may be considered to be primary lookup tables, and result of the lookup performed by each of the classifiers is directed to a respective flow table, i.e. the result of the lookup performed by the EG packet classifier 212 is directed to the flow table 214 and the result of the lookup performed by the IG packet classifier 222 is directed to the flow table 224, as indicated in FIG. 2 with arrows between these elements.

Each packet classifier 212, 222, is programmed with a set of entries, where each entry has set of match criteria and an action to be taken if there is a match.

For example, the IG packet classifier 222 is programmed with a set of entries, where each entry has set of match criteria and an action to be taken if an incoming packet matches the set of match criteria, where the action would typically be to pass the incoming packet to the IG flow table 224. As a result of matching the entries in the IG packet classifier 222, the IG packet classifier also provides a filter ID to the IG flow table 224, the filter ID indicating a type of an RDMA command (i.e. one of e.g. SEND, WRITE, or READ commands) that yielded the match in the entries of the IG packet classifier, for each incoming RDMA work request or response (i.e. for each incoming RoCE packet 254) received at the IG packet classifier 222. Thus, the filter ID provided by the IG packet classifier represents the operation (SEND, WRITE, READ, etc.) and, in combination with the QP ID, it provides an index into the IG flow table 224, i.e. an index as to which entry in the flow table 224 is to be matched.

On the other hand, the EG packet classifier 212 is programmed with a set of entries to be matched by the outgoing RDMA commands 252, such as e.g. RDMA READ, WRITE, SEND, etc. commands, as defined e.g. in the InfiniBand™ Specification. Matching of the entries in terms of the match criteria and action taken for the EG packet classifier 212 is similar to that described above for the IG packet classifier 222, and, therefore, in the interests of brevity is not repeated. Also similar to the IP packet classifier 222, the EG packet classifier 212 is configured to provide a filter ID indicating a particular outgoing RDMA command (i.e. one of e.g. SEND, WRITE, or READ commands) for each outgoing RDMA work request received at the VIC adapter, i.e. received at the EG packet classifier 212. The filter ID provided by the EG packet classifier 212 to the EG flow table 214 represents the outgoing operation (SEND, WRITE, READ, etc.) and, in combination with the QP ID, it provides an index into the EG FT 214, i.e. an index as to which entry in the EG flow table is to be matched.

The flow tables 214 and 224 are configured to act as secondary lookup tables, where some fields in the packets received at the flow tables are matched against contents of the table and the match results in execution of microcode routines called "rewrite rules" by the EG packet processor 216 and the IG packet processor 226, respectively. These rewrite rules are used to encode and decode RoCE packets.

The egress and ingress packet processors 216 and 226 are configured to implement rewrite rules by running appropriate microcode routines. These microcode routines set up DMA contexts, initiate DMA transfers, transform headers of every outgoing packet, validate incoming RoCE packets and update QP context in adapter memory. DMA queue 256 is configured to hold the DMA work requests to be processed by the EG DMA engine 218. The DMA work requests are created based on the RDMA commands as they are executed on the EG packet processor 216.

The egress and ingress DMA engines 218 and 228 are used to move data from host memory to a network 258, e.g. the network 122 shown in FIG. 1, and vice versa. Each of the DMA engines 218 and 228 is configured to notify the data processor 208 upon completion of DMA operations, as shown with EG DMA completion 220 and IG DMA completion 230 arrows going from the DMA engines 218 and 228, respectively, to the data processor 208.

The control channel 210 between the control processor 206 and the data processor 208 provides a shared memory ring buffer to exchange control commands and logs between the control and data processors. The control processor 206 may pass information of QPs, base address of MR table shared between the host 204 and the adapter 202, and memory area where statistical data on that may need to be saved. When a particular QP is deleted, the control processor 206 sends a command to the data processor 208 for freeing up resources related to that QP.

Various command and data exchanges between to RDMA capable compute nodes can be classified into a Connection Phase, a Data Transfer Phase, and a Disconnection Phase.

During a Connection Phase, a HCA creates an RDMA connection with a remote TCA (i.e. with a VIC adapter of the target compute node), creates Protection Domain and QP, and associates the QP with the connection. The remote TCA also associates a QP with the established connection. In this phase, the HCA may determine the operating mode of the target compute node, as described in greater detail below with reference to FIG. 6. The host driver 108 then requests the VIC adapter 120 to create the QP in the desired operating mode.

During a Data Transfer Phase, control and application data (i.e. contents of the application memory) is transferred using Channel semantics (i.e. using RDMA SEND or RECV commands) or memory semantics (i.s. using RDMA READ or WRITE commands). In this phase, based on the operating mode being RoCE v1 or v2, the RoCE combination logic 250 of the host VIC adapter uses RoCE v1 or v2 headers to encapsulate the egress RDMA data and parse the incoming RDMA packet traffic, as described in greater detail below with reference to FIGS. 11 and 12.

During a Disconnection Phase, i.e. when the RDMA connection is being closed either by initiation of the HCA or TCA (or their respective compute nodes), or due to some error, the HCA can trigger a disconnect request, the TCA will respond by sending a disconnect reply and both sides destroy the associated QP and free up the resources. The disconnect request/reply commands flow in appropriate protocol encapsulation. Once the QP is destroyed, it can be re-used for another connection of either RoCE v1 or v2 type.

Figure 4:
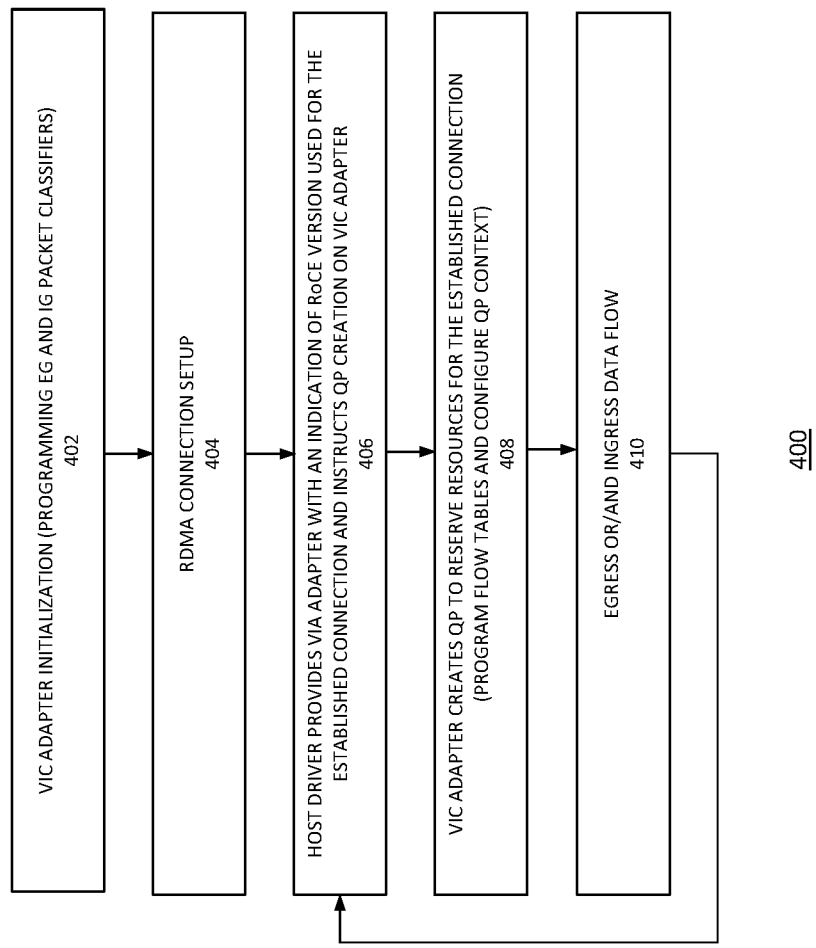
FIG. 4 is a simplified flow diagram illustrating example operations associated with facilitating co-existence of routable and non-routable RDMA solutions on a single network interface, according to some embodiments of the present disclosure.

FIG. 4 is a simplified flow diagram 400 illustrating example operations of an exemplary RoCE combination method associated with facilitating co-existence of routable and non-routable RDMA solutions on a single network interface, according to some embodiments of the present disclosure.

The method 400 may begin with VIC adapter initialization (box 402). VIC adapter initialization refers, in general, to creation of various resources in hardware or firmware that are used to handle EG and IG RDMA data flows, such as e.g. reserving blocks of memory to be mapped to host and other conventional resource reservation functions of the VIC adapter briefly summarized above with reference to FIG. 2. In addition to the conventional functions, RoCE combination method provides that VIC adapter initialization also includes appropriate programming, or configuring, of the EG and IG packet classifiers 212, 222 to simultaneously support classification of RoCE v1 and RoCE v2 commands and packets. Such programming may be considered as a first step in supporting RDMA transport in both RoCE v1 and RoCE v2 modes on a single VIC adapter at the same time.

In an embodiment, programming of the IG packet classifier 222 includes configuring the IG packet classifier 222 with multiple entries for every supported Base Transport Header (BTH) opcode, such as e.g. SEND FIRST, SEND MIDDLE, SEND ONLY, etc, as defined e.g. in the InfiniBand™ Specification. In particular, for every supported BTH opcode, the multiple entries include an entry for every RoCE version to be supported by the VIC adapter—e.g. one entry for RoCE v1 and one entry for RoCE v2. Such programming of the IG packet classifier 222 ensures that the classifier 222 traps the incoming packets in different RoCE versions. For example, one entry could be used to capture the incoming packet in RoCE v1 format, while another entry could be used to capture the incoming packet of the same type in RoCE v2 format. An IG packet classifier 222 entry for RoCE v1 mode the example of RDMA WRITE FIRST packet, the BTH opcode for which is 0x06, is shown in FIG. 5A. FIG. 5B illustrates a similar entry but for RoCE v2-Ipv4 mode. If the VIC adapter is to be configured to also support RoCE v2-Ipv6 mode, then a third entry would be added to the IG packet classifier 222, with corresponding IPv6 fields (not shown in the FIGURES).

The entries described are used similar to any other entries conventionally programmed in the IG packet classifiers, i.e. each entry has set of match criteria, shown for the example of FIG. 5A as a match criteria 502, and an action to be taken if an incoming packet matches the set of match criteria, shown for the example of FIG. 5A as an action 504, where the action would typically be to pass the incoming packet to the IG flow table 224. As a result of matching the entries in the IG packet classifier 222, the IG packet classifier also provides a filter ID to the IG FT 224, the filter ID indicating a type of an RDMA command (i.e. one of e.g. SEND, WRITE, or READ commands) that yielded the match in the entries of the IG packet classifier, for each incoming RDMA work request or response (i.e. for each incoming RoCE packet 254) received at the IG packet classifier 222. Thus, the filter ID provided by the IG packet classifier represents the operation (SEND, WRITE, READ, etc.) and, in combination with the QP ID, it provides an index into the IG flow table 224, i.e. an index as to which entry in the flow table 224 is to be matched.

In an embodiment, programming of the EG packet classifier 212 includes configuring the EG packet classifier 212 with multiple entries to be matched by the outgoing RDMA commands 252, such as e.g. RDMA READ, WRITE, SEND, etc. commands, as defined e.g. in the InfiniBand™ Specification. In particular, for every supported outgoing RDMA command, the multiple entries include an entry for every RoCE version to be supported by the VIC adapter—e.g. one entry for RoCE v1 and one entry for RoCE v2. Such programming of the EG packet classifier 212 ensures that the classifier 212 traps the outgoing RDMA commands in different RoCE versions.

Matching of the entries in terms of the match criteria and action taken for the EG packet classifier 212 is similar to that described above for the IG packet classifier 222, and, therefore, in the interests of brevity is not repeated. Also similar to the IP packet classifier 222, the EG packet classifier 212 is configured to provide a filter ID indicating a particular outgoing RDMA command (i.e. one of e.g. SEND, WRITE, or READ commands) for each outgoing RDMA work request received at the VIC adapter, i.e. received at the EG packet classifier 212. The filter ID provided by the EG packet classifier 212 to the EG FT 214 represents the outgoing operation (SEND, WRITE, READ, etc.) and, in combination with the QP ID, it provides an index into the EG FT 214, i.e. an index as to which entry in the EG flow table is to be matched.

In some embodiments, the VIC adapter initialization of box 402 may be performed when the VIC adapter is powered on or re-booted, i.e. performed dynamically. In other embodiments, the IG and EG packet classifiers may be pre-programmed, i.e. configured, e.g. in hardware, with entries as described above and don't need to be programmed each time the VIC adapter is powered on or re-booted.

Turning back to the method 400 shown in FIG. 4, once the VIC adapter 202 has been initialized, the RoCE combination method may proceed to RDMA connection setup (box 404) that may be initiated by the host compute node. This is a part of the Connection Phase described above.

Figure 6:
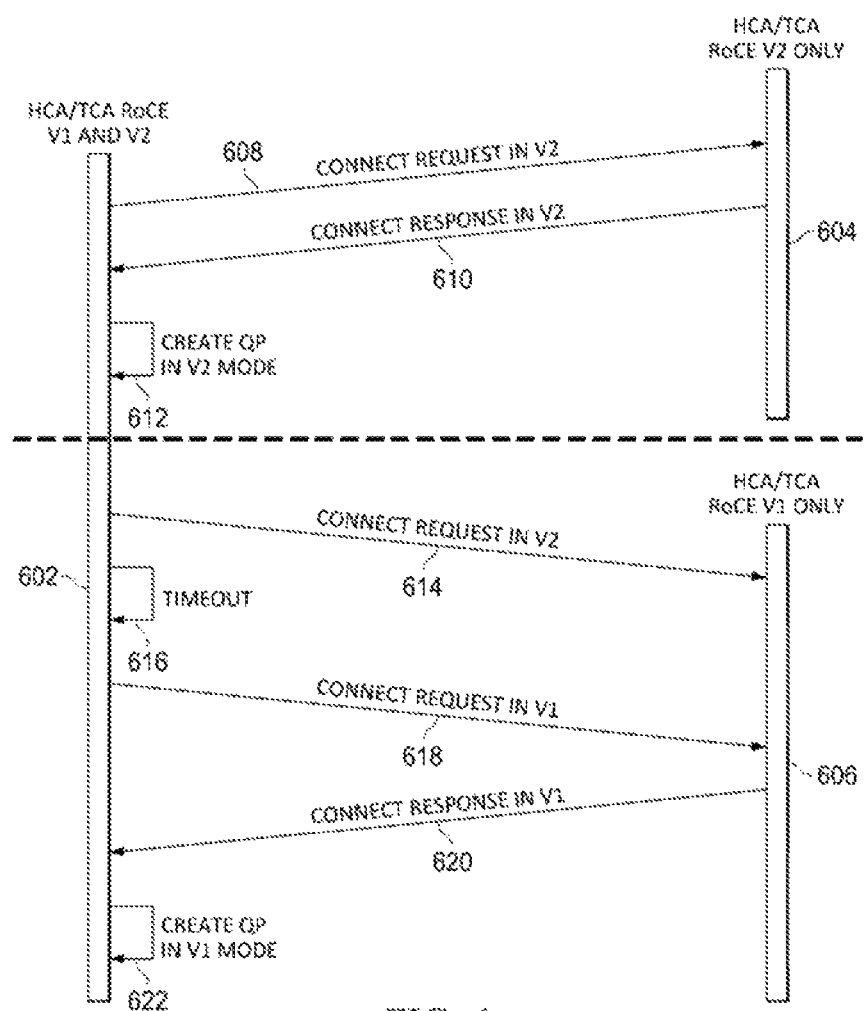
FIG. 6 is a simplified flow diagram illustrating example operations associated with a successful RDMA connection setup in one of the RoCE v1 and RoCE v2 modes, according to some embodiments of the present disclosure.

Conventionally, in the connection phase the HCA, i.e. the VIC adapter 202 together with the associated host driver, communicates with target compute node, exchanges parameters such as e.g. Maximum Segment Size (MSS), queue depth, an initial packet sequence number. If there is agreement between the two nodes, the connection is established and QP is created in the host driver (a corresponding QP is also created in the target driver). On the other hand, FIG. 6 illustrates successful connection setup according to an embodiment of the RoCE combination method. In the proposed RoCE combination approach, the HCA first attempts to establish connection using encapsulation of a particular RoCE version, e.g. using RoCE V2 encapsulation, which is shown in FIG. 6 with an HCA 602 providing a connection request 608 to a TCA 604 which happens to be configured to work in RoCE v2 mode only. Because, in this example, the target node is capable of RoCE v2, the TCA 604 provides a connection response 610 in RoCE v2 and the HCA 602 successfully established the RoCE v2 connection and creates a QP in the host driver, as shown with 614.

Illustration below the horizontal dashed line in FIG. 6 depicts what happens when the HCA first attempts to establish connection using RoCE v2 encapsulation using a connection request 614 with a TCA 606 which happens to be configured to work in RoCE v1 mode only. Since TCA 606 is not capable of interpreting RoCE v2 encapsulation, it will not respond to the HCA 602 and the HCA 602 will time out waiting for Connection reply, as illustrated in FIG. 6 with Timeout 614. Upon the timeout 614, the HCA 602 will retry connection request using encapsulation of a different RoCE mode, e.g. using RoCE V1 encapsulation, as shown with a connection request 618 in RoCE v1. Because, in this example, the target node is capable of RoCE v1, the TCA 606 provides a connection response 620 in RoCE v1 and the HCA 602 successfully established the RoCE v1 connection and creates a QP in the host driver, as shown with 622.

Functionality depicted in FIG. 6 may be carried out by means of the RoCE combination logic 250 described above. The logic 250 may also be configured to handle connection setup failures as illustrated in FIG. 7.

A connection setup failure occurs in case the remote node does not respond within the timeout and retry limit. In FIG. 7, boxes 702, 704, and 706 illustrate successful attempt to create an RDMA connection in RoCE v2, similar to 608, 610, and 612 described with reference to FIG. 6. If connection setup in v2 is not successful, the method proceeds from box 704 to box 708 where the HCA determines whether there is a timeout, similar to timeout 616 in FIG. 6. If so, then the HCA determines if a retry is possible (box 710) and if so, then the HCA determines if the previous try was in v2 (box 712). If so, then the method proceeds to box 714 where a connection setup is re-tried in a different RoCE version than the one timed out, in this example, in v1. The HCA then determines whether there is a connection response (box 716) and, if so, then connection setup in v1 is successful and a QP is created in v1 mode (box 718). In FIG. 7, actions 714, 716, and 718 are similar to 618, 620, and 622 described with reference to FIG. 6.

Figure 7:
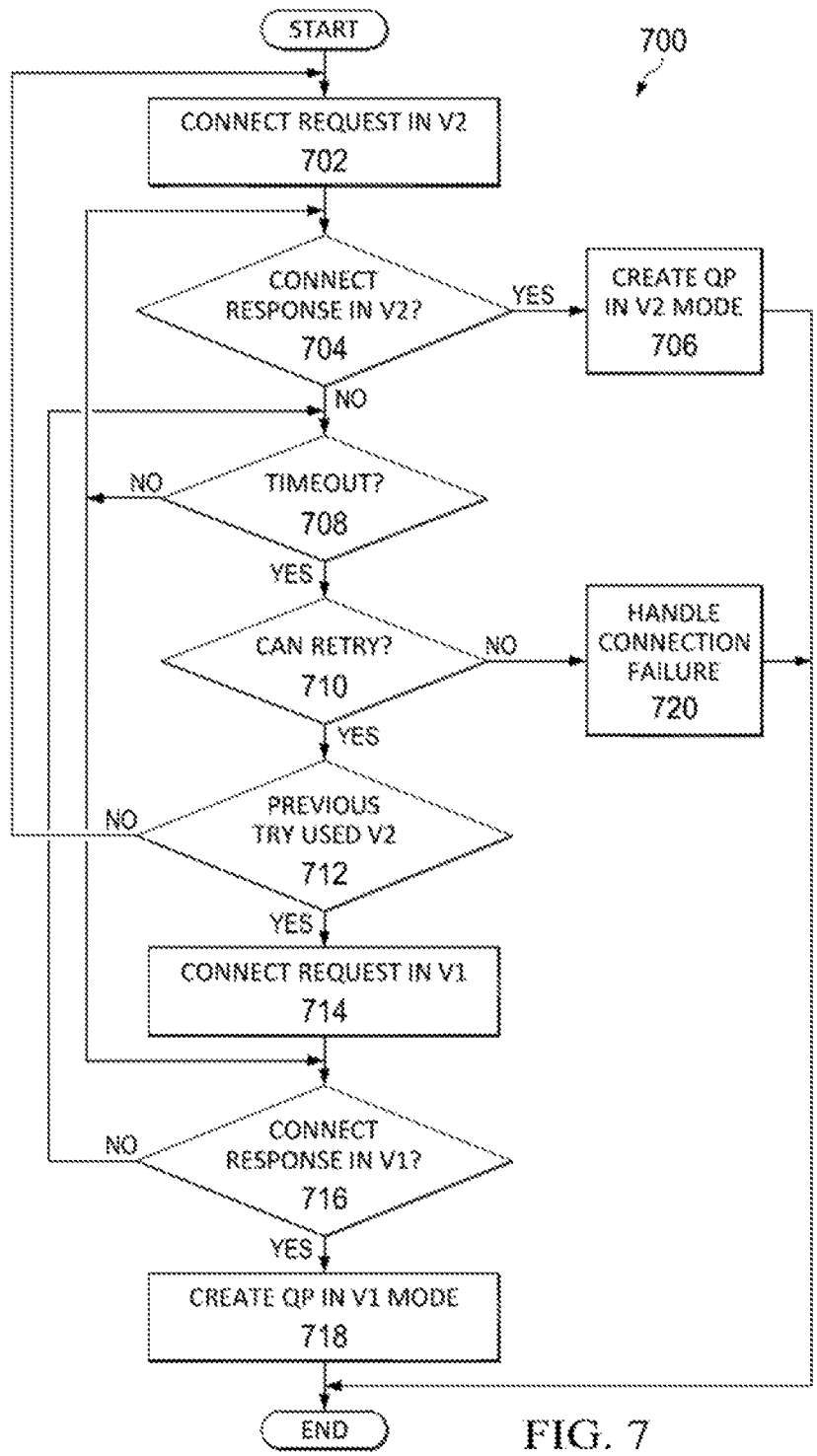
FIG. 7 is a simplified flow diagram illustrating example operations associated with determining the operating version of the peer node and handling a failure during RDMA connection setup, according to some embodiments of the present disclosure.

If there is no timeout in box 708, then the HCA keeps waiting for a connection response, as shown in FIG. 7 with arrows to boxes 704 and 716 from box 708 (depending on which connection request was sent).

As also shown in FIG. 7, if the HCA determines in box 710 that retry is not possible or should not be done, then the method proceeds to box 720 where it handles connection failure. This may be done for the timed out connection requests both in RoCE v1 and v2, as shown with arrows to the timeout 708 when either of the connection requests 704 or 716 are timed out.

Turning back to the method 400 shown in FIG. 4, once an RDMA connection has been setup and a QP identifying the host and the target nodes for this particular connection has been created, the QP identified with a QP ID, the host driver provided the VIC adapter 202 with an indication of the RoCE version used for the connection (i.e. whichever RoCE version connection was successfully established), thereby instructing QP creation on the VIC adapter (box 406).

In some embodiments, a communication manager module, which may be a part of a host driver stack, may be responsible for establishing the connection, determining the version of RoCE protocol to be used, and then signalling the VIC adapter firmware to create QP and reserve necessary resources. The host driver indicates the operating mode of the QP and VIC adapter 202 performs the configuration of resources accordingly.

In some embodiments, the host driver may use a mailbox command to instruct the VIC adapter 202 to create a QP in a particular RoCE mode in the VIC adapter, as shown in FIG. 2 with a mailbox command 260 provided to the control processor 206 of the VIC adapter 202. An example of such a command for creating QP in RoCE v1 mode shown in FIG. 8A, and in RoCE v2 mode—in FIG. 8B.

Comparison of the commands shown in FIGS. 8A and 8B reveals that the command for v2 contains all of the parameters contained in the command for v1. In addition to v1 parameters, with the command for v2 the host driver also supplies source and remote IP addresses to be used (i.e. IP addresses of the host compute node and the target compute node), as shown in FIG. 8B with Word/Byte fields 6 and 7.

The VIC adapter 202 is configured to derive source UDP port based on the QP ID of the host.

Figure 9:
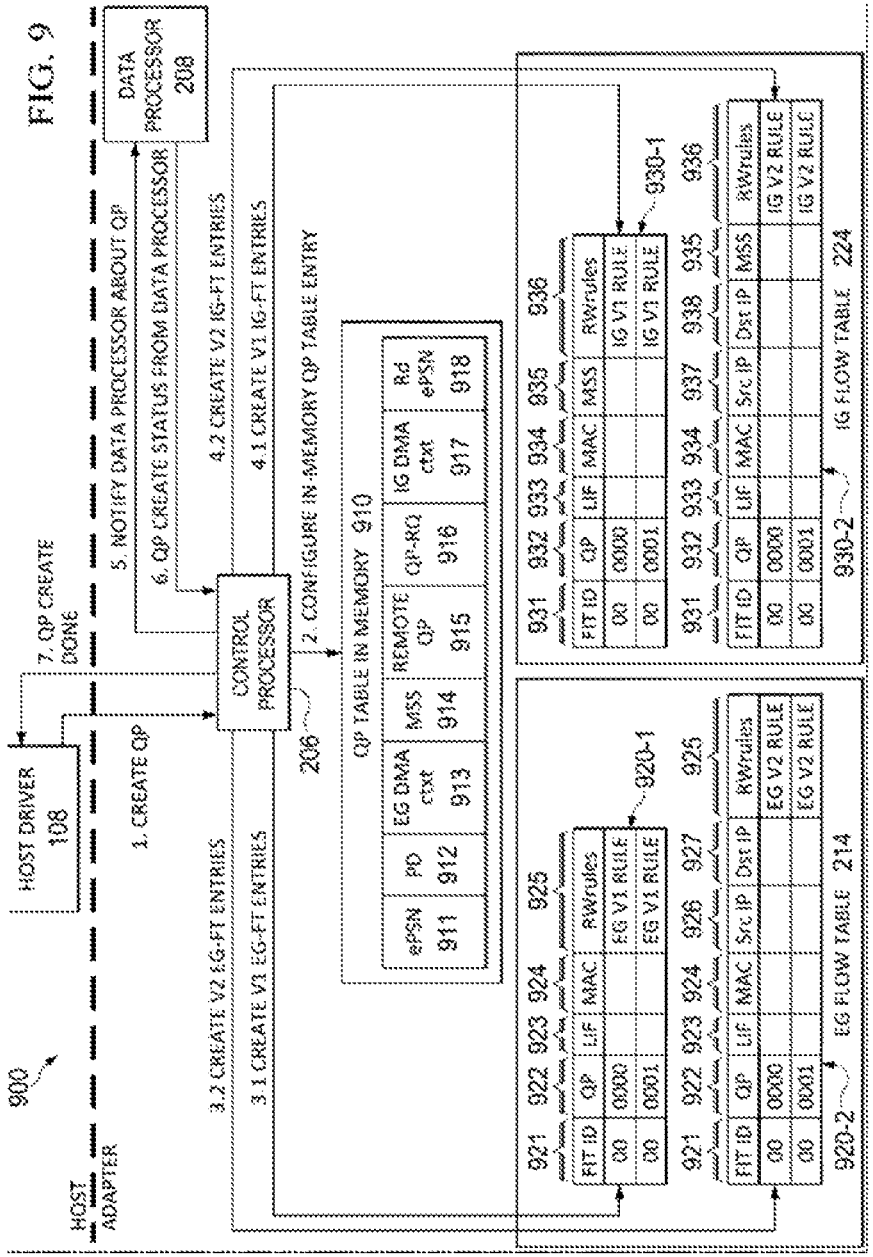
FIG. 9 is a simplified flow diagram illustrating example operations associated with creation of a QP in the VIC adapter, according to some embodiments of the present disclosure.

Turning back to the method 400 shown in FIG. 4, the VIC adapter 202 then processes such a mailbox command, e.g. by the control processor 206, and communicates with the data processor 208 to configure hardware resources for the established connection as per v1 or v2 requirements, depending on the mode that particular QP connection is established in (box 408). The flow of operations performed by the VIC adapter 202 during the creation of QP in box 408 is depicted in FIG. 9 as a method 900. In FIG. 9, reference numerals used in other FIGURES represent elements with those reference numerals shown in those FIGURES, e.g. control processor 206, EG FT 214, etc.

As illustrated in FIG. 9 with step 1, first the host driver, e.g. the host driver 108, issues "Create QP" mailbox command to the VIC adapter. As described above, the mailbox command specifies the QP operating mode to be either v1 or v2 and supplies required parameters such as e.g. those illustrated in FIGS. 8A and 8B.

As illustrated in FIG. 9 with step 2, next the VIC adapter 202 configures QP context in adapter memory by configuring a QP table entry 910 in the memory of the VIC adapter 202. This context is later used by the microcode executed on the IG and EG packet processors 226, 216, e.g. while handling fast path, where, as "fast path" refers to input/output (I/O) performed directly by an ASIC, microcode routine without the intervention by the firmware or software. In various embodiments, configuring a QP context for the connection identified by a certain QP ID could include providing a QP table entry that includes information indicative of one or more of:

- an expected Packet Sequence Number (ePSN) (field 911 in the table entry 910) indicating the sequence number of a next incoming IG packet,
- Protection Domain (PD) (field 912 in the table entry 910) of the connection identified by the QP ID (Protection Domain being an entity as defined in the InfiniBand™ Specification, mainly used to associate QPs with MRs and to make sure QPs can do I/O to MRs that belong to the same PD),
- DMA context for the EG operation (field 913 in the table entry 910) for the connection identified by the QP ID, indicating a state of egress DMA operation, where, as used herein, a state of an EG DMA operation refers to location in memory where host buffers are stored and the pointer indicating the current location where DMA is active,
- MSS (field 914 in the table entry 910) configured for the connection identified by the QP ID,
- Remote QP ID (field 915 in the table entry 910), i.e. a QP ID used by a driver of the target compute node, a QP ID on the other side of the RDMA connection,
- Read Queue (RQ) ID (field 916 in the table entry 910) of the connection identified by the QP ID indicating RQ number associated with the QP IP (the RQ ID pointing to the VIC adapter memory where host buffers are queued and the incoming SEND operations provide the incoming data to these buffers using DMA),
- DMA context for the IG operation (field 917 in the table entry 910) for the connection identified by the QP ID indicating a state of the ingress DMA operation, where, as used herein, a state of an IG DMA operation refers to location in memory where host buffers are stored and the pointer indicating the current location where DMA is active, and
- expected Packet Sequence Number of next READ response packet (Rd ePSN) (field 918 in the table entry 910) during a READ command of the connection identified by the QP ID indicating a packet sequence number in the incoming READ response packets.

As illustrated in FIG. 9 with step 3 and 4, next the VIC adapter 202 programs EG FT 214 and IG FT 224, which could be performed in any sequential order, substantially simultaneously, or overlapping in time.

Programming the EG and IF flow tables includes the VIC adapter 202 creating a QP in an RoCE mode was indicated to the VIC adapter 202 by the host driver, the RoCE mode in which a particular QP was created in the host driver.

For the EG FT 214 programming, if the QP was created in RoCE v1 mode, then VIC adapter 202 programs a flow table entry for that particular QP as shown in FIG. 9 with two exemplary table entries (for QP IDs 0000 and 0001) with a EG FT 920-1. On the other hand, if the QP was created in RoCE v2 mode, then VIC adapter 202 programs a flow table entry for that particular QP as shown in FIG. 9 with two exemplary table entries (for QP IDs 0000 and 0001) with a EG FT 920-2.

For the EG FT 214 programming, for each QP that was created in RoCE v1 mode, an EG FT entry includes the following fields:

- the filter ID (Flt ID) (field 921 in the example of the EG FT 920-1) obtained from the EG packet classifier 212, indicating the type of the outgoing RDMA command for the QP,
- the QP ID of the QP (field 922 in the example of the EG FT 920-1),
- a Logical Interface (LIF) identification (field 923 in the example of the EG FT 920-1) identifying a particular logical interface of the hardware network interface 110 on the host compute node,
- an (L2) address (e.g. MAC address) of the target compute node (i.e., of the remote peer) (field 924 in the example of the EG FT 920-1), and
- a ReWrite rule (RWrule) (field 925 in the example of the EG FT 920-1) comprising RoCE v1 specific microcode to be executed on the EG packet processor 216 for encapsulating the outgoing RDMA command 252.

For the EG FT 214 programming, for each QP that was created in RoCE v2 mode, an EG FT entry includes the fields 921-925 as for RoCE v1 mode, and, additionally, also includes:

- an L3 address (e.g. IP address) of the source (Src IP) (field 926 in the example of the EG FT 920-2), i.e. an L3 address of the host compute node, and
- an L3 address of the destination (Dst IP) (field 927 in the example of the EG FT 920-2), i.e. an L3 address of the target compute node.

The L3 addresses of the host and target nodes provided in the EG FT entries for each QP allows validating the incoming RoCE v2 packets to make sure that they are valid for a given QP.

When an outgoing RDMA command 252 for a particular QP matches the EG command identified by the filter ID provided from the EG packet classifier 212, i.e. when an outgoing RDMA command matches the Filter ID 921 and QP 922 of a particular entry in the EG FT 214 (921 and 922 being the match criteria in this case), an action taken is to invoke the rewrite of the RDMA command as specified in the field RWrule 925 for that entry. The rewrite rule is a RoCE version specific microcode to be executed on the EG packet processor 216 to encapsulate the RDMA command for the QP into a packet of the appropriate RoCE version. Thus, the filter ID provided by the EG packet classifier 212 to the EG FT 214 represents the outgoing operation (SEND, WRITE, READ, etc.) and, in combination with the QP ID, it provides an index into the EG FT 214, i.e. an index as to which entry in the EG flow table is to be matched, which, in turn, decides which rewrite rule is executed to include the outgoing RDMA command as a payload in a RoCE packet in accordance with the RoCE version for the connection established in 404. The rewrite rules for the EG FT entries programmed for the QPs that are established in RoCE v1 mode (e.g. entries as in 920-1) ensure encapsulation of RDMA commands for those QPs in RoCE v1 format, while the rewrite rules for the EG FT entries programmed for the QPs that are established in RoCE v2 mode (e.g. entries as in 920-2) ensure encapsulation of RDMA commands for those QPs in RoCE v2 format.

For the IG FT 224 programming, IG flow tables are used as secondary look up tables when RoCE packets 254, encapsulated according to any one of RoCE versions, arrive at the VIC adapter 202. If there is a hit (match) in the IG FT 224, an action in a form of a corresponding rewrite rule is executed to decode or decapsulate the incoming RoCE packet to extract the RDMA work request or response carried, as a payload, in the packet. After that, the necessary DMA operation as specified by the extracted RDMA work request or response, may be carried out.

For the IG FT 224 programming, if the QP was created in RoCE v1 mode, then VIC adapter 202 programs a flow table entry for that particular QP as shown in FIG. 9 with two exemplary table entries (for QP IDs 0000 and 0001) with a IG FT 930-1. On the other hand, if the QP was created in RoCE v2 mode, then VIC adapter 202 programs a flow table entry for that particular QP as shown in FIG. 9 with two exemplary table entries (for QP IDs 0000 and 0001) with a IG FT 930-2.

For the IG FT 224 programming, for each QP that was created in RoCE v1 mode, an IG FT entry includes the following fields:
  the filter ID (Flt ID) (field 931 in the example of the IG FT 930-1) obtained from the IG packet classifier 222, indicating the BTH opcode in the incoming RoCE packet for the QP,
  the QP ID of the QP (field 932 in the example of the IG FT 930-1),
  the LIF identification (field 933 in the example of the EG FT 920-1) as described above,
  the L2 address (e.g. MAC address) of the target compute node (i.e., of the remote peer) (field 934 in the example of the IG FT 930-1),
  the MSS (field 935 in the example of the IG FT 930-1) configured for the QP (if the incoming RoCE packet is either First or Middle packet of RDMA operation sequence, then the packet size should match the MSS configured), and
  a ReWrite rule (RWrule) (field 936 in the example of the IG FT 930-1) comprising RoCE v1 specific microcode to be executed on the IG packet processor 226 for decapsulating the incoming RoCE packet 254 to extract the RDMA work request or response carried therein.

For the IG FT 224 programming, for each QP that was created in RoCE v2 mode, an IG FT entry includes the fields 931-936 as for RoCE v1 mode, and, additionally, also includes:
  an L3 address (e.g. IP address) of the source (Src IP) (field 937 in the example of the IG FT 930-2), i.e. an L3 address of the host compute node, and
  an L3 address of the destination (Dst IP) (field 938 in the example of the IG FT 930-2), i.e. an L3 address of the target compute node.

Providing the L3 addresses of the host and target nodes in the IG FT entries for each QP allows routing RDMA flows between those addresses, thereby supporting implementation of routable RDMA solutions.

When an incoming RoCE packet 254 for a particular QP matches the IG BTH opcode identified by the filter ID provided from the IG packet classifier 222, i.e. when the incoming RoCE packet matches the Filter ID 931 and QP 932 of a particular entry in the IG FT 224 (931 and 932 being the match criteria in this case), an action taken is to invoke the rewrite of the RoCE packet as specified in the field RWrule 936 for that entry. For RoCE v2 QPs, the incoming packet should also match Source and Destination IP addresses 937 and 938, in addition to rest of the RoCE v1 parameters. The associated rewrite rule can decode RoCE v1 or RoCE v2 protocol in the incoming packet 254.

In case of IG, the rewrite rule is a RoCE version specific microcode to be executed on the IG packet processor 226 to extract the RDMA data from the payload of an incoming RoCE packet of one of the RoCE versions. Thus, the filter ID provided by the IG packet classifier 222 to the IG FT 224 represents the incoming BTH opcode and, in combination with the QP ID, it provides an index into the IG FT 224, i.e. an index as to which entry in the IG flow table is to be matched, which, in turn, decides which rewrite rule is executed to decapsulate the incoming RoCE packet in accordance with the RoCE version for the connection established in 404. The rewrite rules for the IG FT entries programmed for the QPs that are established in RoCE v1 mode (e.g. entries as in 930-1) ensure decapsulation of RoCE packets for those QPs in RoCE v1 format, while the rewrite rules for the IG FT entries programmed for the QPs that are established in RoCE v2 mode (e.g. entries as in 930-2) ensure decapsulation of RoCE packets for those QPs in RoCE v2 format.

For each BTH opcode as identified by the Filter ID 931 and a match in flow table results in execution of separate RoCE V1 rewrite microcode routine. The job of the microcode routine associated with IG flow table is to decode an incoming packet, which can carry as its payload either a RDMA work request or a RDMA work response, and do necessary DMA operation. Based on RoCE version used for a particular QP connection, the microcode routines executing on packet processors applies decoding logic and performs DMA or any other necessary operations. In addition to decoding the incoming RoCE packet, the microcode routine carried out by the packet processor may be configured to validate protocol correctness and channel the packet to the IG DMA engine 228.

Since the VIC adapter 202 may support RDMA transports for the host compute node with multiple target compute nodes which may operate according to different RoCE versions, in accordance with the RoCE combination method presented herein, at least at some points in time, each of the EG FT 214 and IG FT 224 could, and typically would, contain entries for QPs that were created in different RoCE versions. Thus, the VIC adapter 202 is able to simultaneously support RDMA transport according to different RoCE versions. In this context, the term "simultaneously" indicates that, at any particular time, the VIC adapter is able to ensure RDMA transport according to multiple RoCE versions, regardless of whether or not RDMA transport according to any of those versions is actually taking place at that time.

Step 5 shown in FIG. 9 illustrates the VIC adapter 202 validating the parameters and selects one of the available data processors to service fast path operations for this QP.

Step 6 shown in FIG. 9 illustrates the data processor 208 creating private structures to track the status of request, response and acknowledgments for the QP and returning status back to the control processor 206.

Step 7 shown in FIG. 9 illustrates the VIC adapter 202 finally notifying the host of QP creation completion status.

Again turning back to the method 400 shown in FIG. 4, once the EG and IG flow tables are configured and resources are reserved, EG and IG data flow for the RDMA connection established in box 404, as identified by its QP ID, may proceed (box 410).

Figures 10A, 10B:
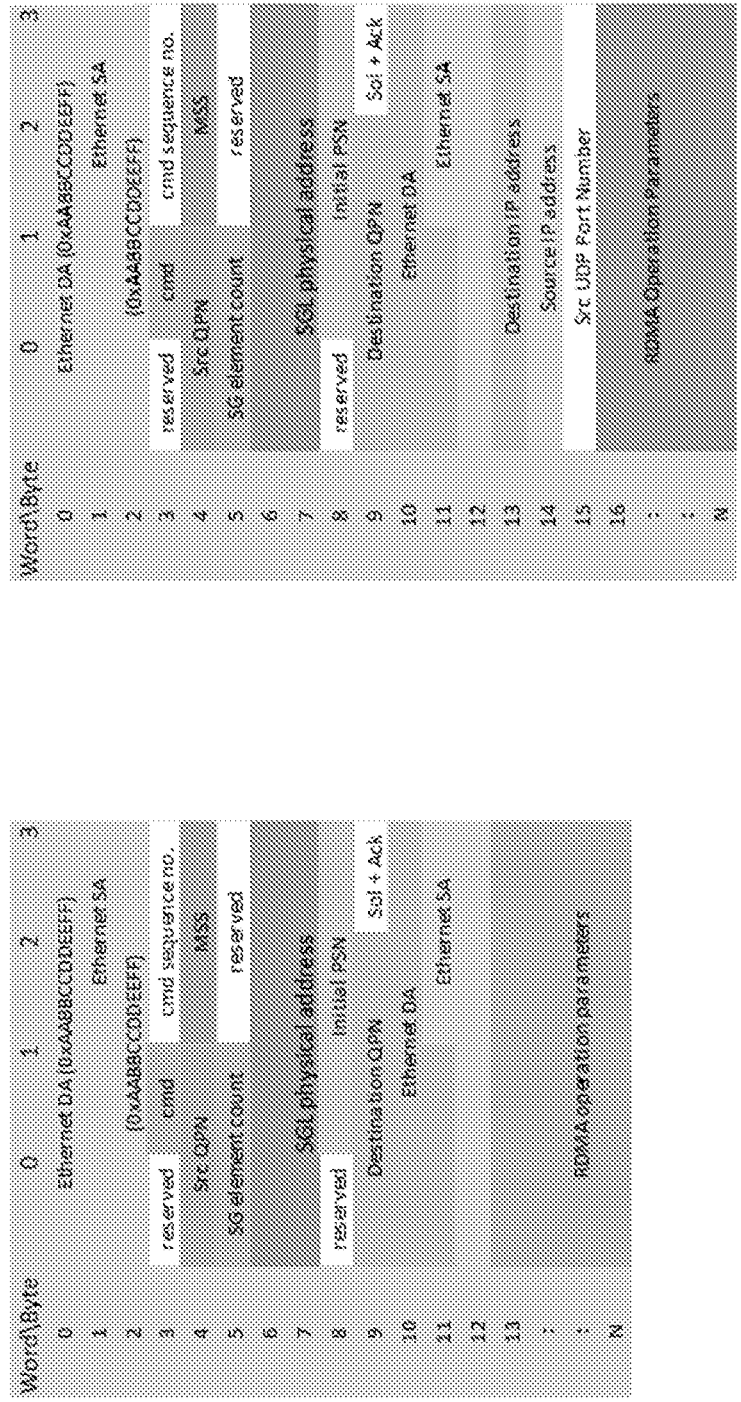
FIGS. 10A and 10B illustrate exemplary EG command formats for, respectively, RoCE v1 and RoCE v2-IPv4 modes, according to some embodiments of the present disclosure.

In some embodiments of the RoCE combination method 400, the host driver 108 may be configured to provide (export), to users of RDMA, an interface in accordance with RDMA Protocol Verbs Specification Volume 1.2.1 the description of which is included herein in its' entirety. For example, "Post Send" Verbs interface is used to post EG commands on the side of the QP that carries out the sending. In some embodiments, this interface may be common to QPs operating in both v1 and v2 mode, so that the host driver could provide a uniform interface to the users and hide the implementation details in the host driver to VIC adapter interface layer. FIGS. 10A and 10B illustrate exemplary EG command formats for, respectively, RoCE v1 and RoCE v2-IPv4 modes, according to some embodiments of the present disclosure.

In an embodiment, the host driver 108 may be configured to first provide the outgoing RDMA commands with an Ethernet header with some arbitrary or predetermined, i.e. fake, destination (i.e. target compute node) and source (i.e. host compute node) MAC addresses in the fields of Word/Bytes 10 and 11, respectively, as shown in FIGS. 10A and 10B. This ensures that, when the VIC adapter 202 performs DMA out operation of the command, the EG packet classifier 212 can trap these commands and redirect them to the EG FT 214. The host driver posts these commands on the EQ CMD WQ 234.

The "cmd" field as shown in Word/Byte 3 of the command formats shown in FIGS. 10A and 10B indicates the type of outgoing RDMA command, which can be e.g. one of SEND, WRITE, READ, SEND and INVALIDATE and READ RESPONSE. The data processor 208 is configured to generate EG responses to the READ requests.

Figure 11:
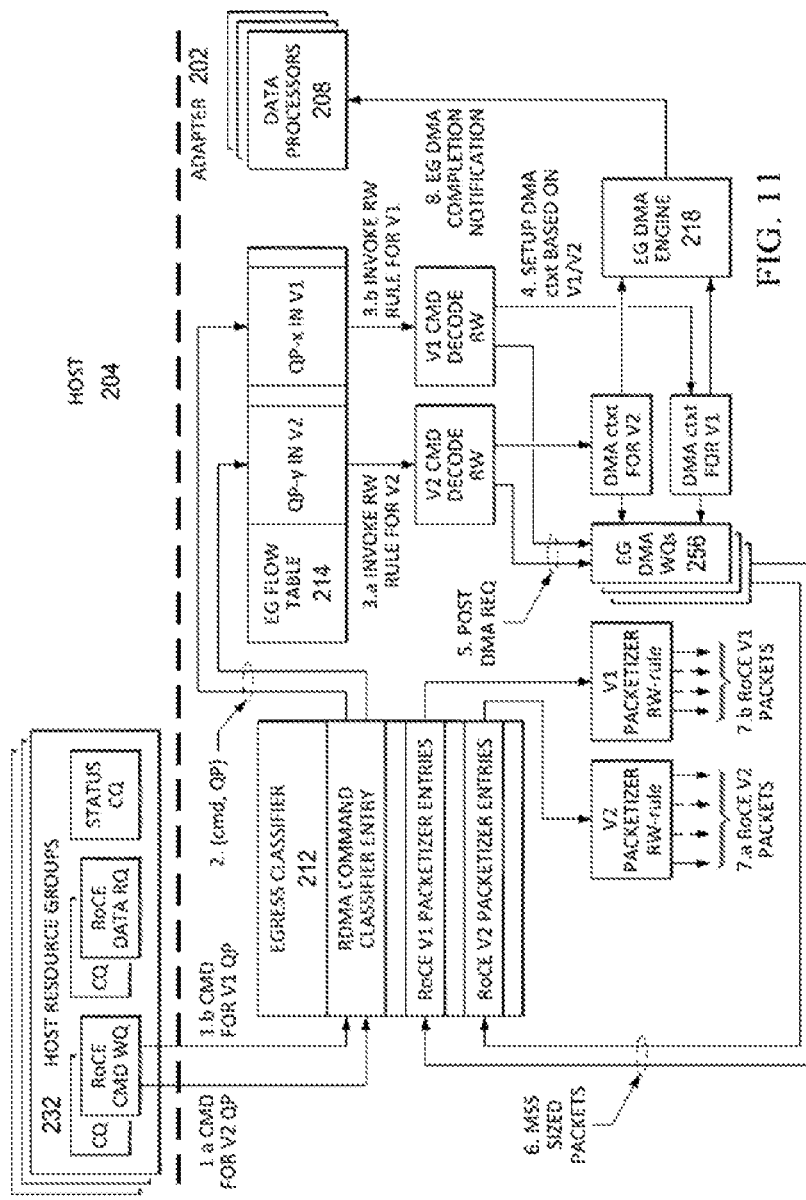
FIG. 11 is a simplified flow diagram illustrating example operations associated with RDMA EG command and data flow, according to some embodiments of the present disclosure.

FIG. 11 is a simplified flow diagram 1100 illustrating example operations associated with RDMA EG command and data flow, according to some embodiments of the present disclosure.

As previously described herein, the host driver 108 has a number of command queues available for posting the RDMA commands. For example, these command queues can be assigned to different CPU cores, so that performance can be maximized. The flow of command and data through various functional blocks is described below with reference to FIG. 11. In FIG. 11, reference numerals used in other FIGURES represent elements with those reference numerals shown in those FIGURES, e.g. EG packet classifier 212, Host resource groups 232, etc.

As illustrated in FIG. 11 with step 1, the host driver posts the RDMA commands on the Work Queue (1.a illustrates an outgoing RDMA command for RoCE v2 QP and 1.b illustrates a command for RoCE v1 QP). The format of the command for RoCE v1 and v2 could be as shown in FIGS. 10A and 10B.

As illustrated in FIG. 11 with step 1, the EG packet classifier 212 is programmed, as described above, to trap these commands and based on the command and QP ID, a flow table entry in the EG FT 214 is selected. Again, the FT entries are associated with rewrite rules/microcode routines which are executed on the corresponding packet processor when there is a hit on the flow table.

As illustrated in FIG. 11 with step 3, based on the operating mode of the QP for which the RDMA command is being processed, v1 or v2 specific rewrite rule is selected. This rewrite rule is configured to decode the egress command and select a free DMA context.

As illustrated in FIG. 11 with step 4, the EG PKT processor 216 programs the DMA context with parameters from the RDMA command packet. If the operating mode is RoCE v1, the v1 command decode rewrite rule executing on EG PKT processor 216 saves the Source MAC and destination MAC address in the DMA context. For v2 QPs, the v2 command decode rewrite rule executing on EG PKT processor 216 saves the source and destination IP addresses, in addition to the MAC addresses. The destination QP number, MSS and starting Packet Sequence Number is saved irrespective of operating mode. DMA context is also updated with the operating mode to be used.

As illustrated in FIG. 11 with step 5, the rewrite rule forms DMA WQ descriptors encapsulating the DMA context ID, host Scatter Gather (SG) List physical address and number of elements in SG list, as known in the art.

As illustrated in FIG. 11 with step 6, the EG DMA engine 218 is configured for transferring the data out of host memory and breaking them into MSS sized packets. These packets carry the operating mode (e.g. RoCE v1 or v2) in one of the headers.

As illustrated in FIG. 11 with step 7, these packets go through the EG packet classifier 212 on their way out and, based on operating mode in the header, different EG classifier entries are matched. Based on the outcome of the match, v1 packetizer or v2 packetizer rule is selected.

Indicated with 7.a in FIG. 11, the v2 packetizer rule transforms the DMA engine generated packets to RoCE v2 packets by placing proper header and generating Invariant Cyclic Redundancy Check (ICRC) checksum at the end. The microcode also requests the egress network block 258 to generate IPv4 checksum.

Indicated with 7.b in FIG. 11, the v1 packetizer rule encapsulates the packet in v1 header and also calculates and places the ICRC at the end.

As illustrated in FIG. 11 with step 8, the status of DMA operation is notified to the software running on one of the data processors 208.

The host driver which posted the RDMA command now waits for the Acknowledgement (ACK) to arrive from the other end, i.e. from the target compute node. In an embodiment, the VIC adapter may be configured so that the egress DMA completion is notified only to the firmware running on the data processor 208 and is not communicated to the host driver 108, thereby avoiding unnecessary interrupt overhead in the host domain.

Based on the version of RoCE protocol, the incoming RoCE packets 254 can be either in RoCE v1 or v2 format. However once they are decoded according to the protocol syntax, the rest of the operation related to RDMA remains same across v1 and v2 protocol and as known in the art.

In some embodiments, generation of Acknowledgement packets may be offloaded to one of the data processors 208, thus significantly reducing host overhead since the host does not need to be interrupted for RDMA operations that do not generate completions in CQ of the QP.

The sequence of operations that are performed on ingress RoCE packets is described with reference to FIG. 12 providing a simplified flow diagram 1200 illustrating example operations associated with RDMA IG data flow, according to some embodiments of the present disclosure.

The RoCE packets 254 enter the VIC adapter 202 via the network block 258. Both v1 and v2 packets go through the IG packet classifier 222. As described above, the IG packet classifier 222 is programmed to match all RDMA transport types of interest in both v1 and v2 format. The IG packet classifier 222 is also programmed to trap RoCE packets with invalid fields in header that violate the protocol. The IG RoCE packets can be classified into three main categories.

The first category includes "First" or "Only" packets. These incoming RoCE packets would include the first packet to arrive in a stream of packets for a particular operation type such as RDMA WRITE or SEND. If the size of the total data is less than the MSS, then entire payload is encapsulated in a single "Only" packet. In case of WRITE request, the packet carries RETH header, as known in the art.

The second category includes "Middle" packets. These incoming RoCE packets would include non-first packets which follow a preceding "first" packet. The size of the payload in each middle packet should match the MSS.

The third category includes "Last" packets. These incoming RoCE packets would include the last packet of each RDMA transaction. After the last packet is processed by the receiving VIC adapter, the VIC adapter needs to generate ACK.

As previously described herein, the IG packet classifier 222 is programmed to match "First", "Middle", "Last" and "Only" packets both in v1 and v2 versions.

The work flow shown in FIG. 12 and outlined below describes operation of the VIC adapter 202 starting from the "first" packet to the "Last" packet.

Figure 12:
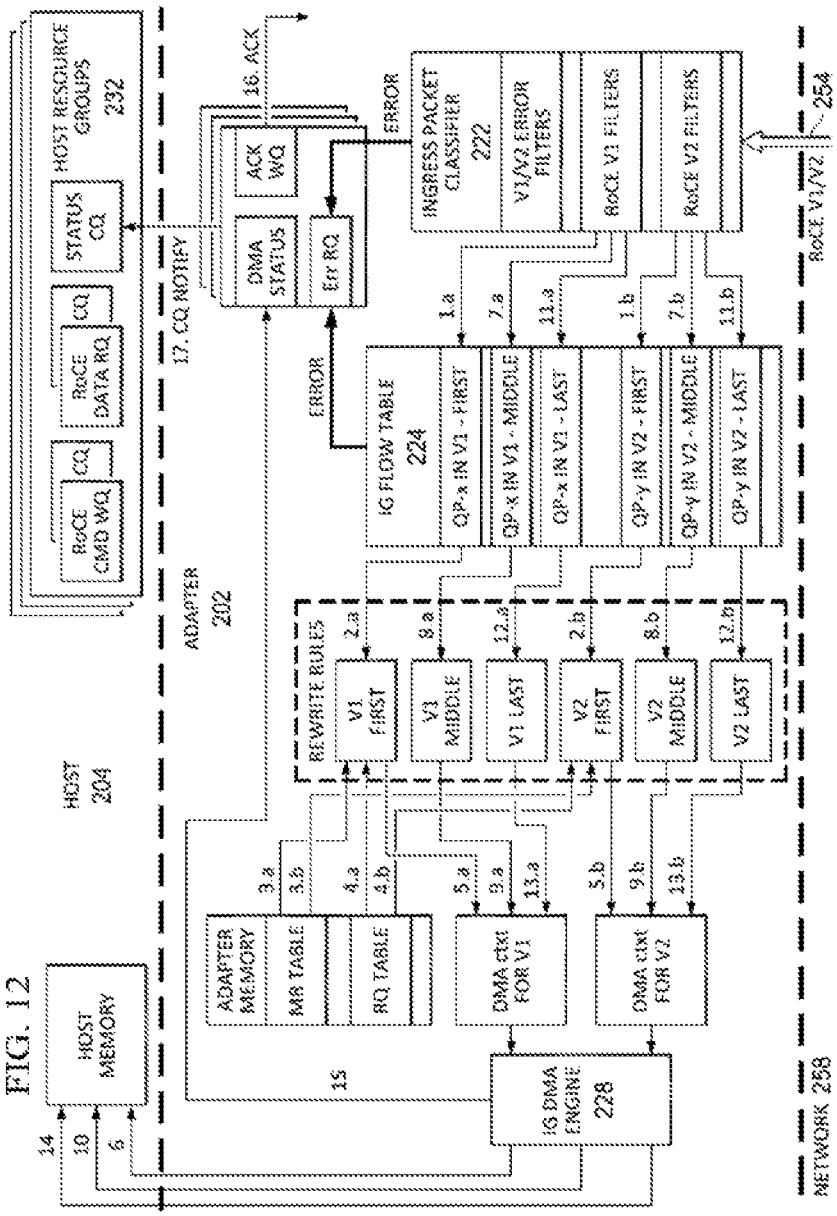
FIG. 12 is a simplified flow diagram illustrating example operations associated with RDMA IG data flow, according to some embodiments of the present disclosure.

As illustrated in FIG. 12 with step 1, the ingress "First" packet in v1 or v2 mode matches the appropriate classifier entry of the IG packet classifier 222. The result of the match is a tuple, <Filter ID, QP ID>. The Classifier Filter ID is based on RDMA transaction type (WRITE/SEND/READ) and "First" packet of the transaction. This tuple is used to form an index into the IG FT 224. Based on the operating mode of the QP identified by that QP ID, the IG FT 224 is used as secondary lookup table to match more parameters in the packet header and invoke a rewrite rule which executes on the IG packet processor 226.

As illustrated in FIG. 12 with step 2, based on the operating mode of the QP ID, rewrite rule specific to v1 or v2 mode is selected to run. The rewrite rule validates the packet for errors such as sequence errors, access violation or incorrect ICRC.

As illustrated in FIG. 12 with step 3, if the ingress operation is RDMA WRITE, the remote key in the packet header is used to look up Memory Region Table to obtain host memory address.

As illustrated in FIG. 12 with step 4, if the ingress packet is for the receive operation, the rewrite rule looks up the RQ table of the QP to obtain host address of receive buffer.

As illustrated in FIG. 12 with step 5, the rewrite rule triggered for the "first" packet also configures DMA context and configures the SG list for the DMA.

As illustrated in FIG. 12 with step 6, the IG DMA engine 228 uses the DMA context and DMAs the first packet to host memory.

As illustrated in FIG. 12 with step 7, the RDMA transaction can consist of one or more middle packets. These are matched in the IG packet classifier 222. The result of the match is again a tuple <Filter ID, QP ID> which is used to index into the IG FT 224.

As illustrated in FIG. 12 with step 8, the rewrite rules associated with middle packets are executed. Based on the operating mode (v1 or v2) the packet headers are decoded and validated.

As illustrated in FIG. 12 with step 9, the middle packets are also fed into the IG DMA engine 228, updating the DMA context to track DMA transfer.

As illustrated in FIG. 12 with step 10, the payload in the middle packets is provided, by DMA, into the host memory.

As illustrated in FIG. 12 with step 11, the RDMA transaction ends when "Last" packet in the sequence is received. This is, again, matched in the IG packet classifier 222 and subsequently indexed into the IG FT 224. The result of the IG FT 224 match is execution of associated rewrite rule which depends on whether the transaction is for a QP in RoCE v1 or v2 mode.

As illustrated in FIG. 12 with step 12, the packet rewrite rule decodes the "Last" packet header, validates it, and updates the QP related information in adapter memory.

As illustrated in FIG. 12 with step 13, the "Last" rewrite rule signals the end of DMA transaction by updating the DMA context accordingly.

As illustrated in FIG. 12 with step 14, the IG DMA engine 228 transfers the payload associated with "Last" packet to the host memory.

As illustrated in FIG. 12 with step 15, the IG DMA engine 228 also sends notification to one of the data processors 208 to indicate completion of ingress RDMA transaction.

As illustrated in FIG. 12 with step 16, the data processor 208 is configured to send the "ACK" response and based on the operating mode of the QP, it encapsulates ACK in RoCE v1 or v2 mode.

As illustrated in FIG. 12 with step 17, if the ingress RDMA transaction requires CQ entry to be generated for the QP, the data processor 208 sends notification to the host driver 108.

Further embodiments of the RoCE combination method allow detecting and handling errors when the ingress packets 254 do not meet required criteria. To that end, in some embodiments, one or more of the IG packet classifier 222, the IG FT 224, and an appropriate packet rewrite rule executing on packet processor 226 may be configured to detect errors as follows.

The IG packet classifier 222 may be configured to detect errors by determining whether some of the header fields in the packet header do not conform to RoCE v1 or v2 standard, in which case the classifier 222 identifies them as error packets and directs them to the data processor 208 for further handling. For example, the version field in BTH header should be zero, or, the checksum field in UDP header of a RoCE v2 packet must be zero.

For the IG FT 224 detecting errors, these are the errors that occur due to mismatch in the IG FT 224 entry lookup. For example, if the QP ID in BTH header is not one of the valid ones, there will be a miss in the IG FT lookup, or, if the Source MAC in the packet header does not match the one programmed in the IG FT entry, then the ingress packet cannot be processed further and is redirected to the data processor 208.

Errors detected by the packet rewrite rule could be divided into protocol errors and checksum errors. For protocol errors, if the rewrite rules detect error while processing the "first", "middle", "only" or "last" packet, then the DMA transaction is terminated and error is notified to data processor 208. For checksum errors, the rewrite rules compute and verify the ICRC in the incoming RoCE v1 and v2 packets. They also monitor the IPv4 checksum error field for RoCE v2 packets and drop the packet silently if any of the checksums are invalid.

In various embodiments, the data processor 208 may be configured to either drop the packet or notify the host driver for further handling. In some implementations it may be preferable to drop the incoming packets 254 with some of the errors such as incorrect ICRC or invalid BTH version. However, if the ingress RoCE packets have incorrect MSS or do not have valid permission to perform WRITE/READ, then the data processor 208 may be configured to forward the error to the host driver 108. The host driver may be configured to then issue an appropriate negative acknowledgement and initiate connection tear down of the RDMA connetion.

In summary, routable RDMA is quickly becoming one of the key transport protocols to be used in the modern day datacenters. However, there are still a good number of applications that are deployed on non-routable RDMA. The application and middleware vendors in storage and High Performance Computing (HPC) domain are beginning to take advantage of routable RDMA. Until routable RDMA is fully adopted by the hardware vendors, there might be a need to support both routable and non-routable RDMA solutions in the same data center. In addition, based on the scale of a datacenter, it is highly desirable that configuration of RDMA operating mode is automated. The RDMA providers should be able to learn the capability of the other nodes in the network and establish connections accordingly. Existing solutions provided by competing NIC vendors lack this ability to operate in a mixed mode. In contrast, RoCE combination embodiments described herein help to offer techniques for providing an agile VIC adapter that can be automatically programmed to support any packet transport protocol. In particular, the VIC adapter described herein is capable of providing both RoCE v1 and v2 support on the same network interface, thus making unified computing system (UCS) deployments with VIC adapters a perfect candidate for storage and HPC market.

Some Examples in accordance with various embodiments of the present disclosure are now described.

Example 1 provides a method for simultaneously supporting, on a host VIC adapter of a host compute node, RDMA transport according to at least two RoCE versions. The method includes receiving, at the host VIC adapter, from a host driver of the host compute node, an indication of a RoCE version, out of the at least two RoCE versions, used for an RDMA connection between the host compute node and a target compute node, the connection identified by a first QP ID; programming an Egress (EG) packet classifier and an EG flow table of the host VIC adapter to enable encapsulation of outgoing RDMA commands for the connection identified by the first QP ID according to the RoCE version indicated for the connection identified by the first QP ID; and programming an Ingress (IG) packet classifier and an IG flow table of the host VIC adapter to enable decapsulation of incoming RoCE packets for the connection identified by the first QP ID according to the RoCE version indicated for the connection identified by the first QP ID.

Example 2 provides the method according to Example 1, where the programming the EG packet classifier includes providing in the EG packet classifier a plurality of entries to be matched by the outgoing RDMA commands, the plurality of entries including a respective entry for each of the at least two RoCE versions of the outgoing RDMA commands.

Example 3 provides the method according to Example 1, where programming the EG flow table includes creating an EG flow table entry for the connection identified by the first QP ID and ensuring that, when an outgoing RDMA command for the connection identified by the first QP ID matches the EG flow table entry, the outgoing RDMA command is encapsulated according to the RoCE version indicated for the connection identified by the first QP ID.

Example 4 provides the method according to Example 3, where, when the RoCE version indicated for the connection identified by the first QP ID is a RoCE version 1 (v1) version, the EG flow table entry includes the first QP ID, a filter ID obtained from the EG packet classifier, a Logical Interface (LIF) identification (ID) identifying a network interface on the host compute node, a Layer 2 (L2) address of the target compute node, and a RoCE v1 specific microcode to be executed on an EG packet processor of the host VIC adapter for encapsulating the outgoing RDMA command; and, when the RoCE version indicated for the connection identified by the first QP ID is a RoCE version 2 (v2) version, the EG flow table entry includes the first OP ID, the filter ID obtained from the EG packet classifier, the LIF ID identifying the network interface on the host compute node, the L2 address of the target compute node, a Layer 3 (L3) address of the host compute node, an L3 address of the target compute node, and a RoCE v2 specific microcode to be executed on the EG packet processor of the host VIC adapter for encapsulating the outgoing RDMA command.

Example 5 provides the method according to Example 1, where programming the IG packet classifier includes providing in the IG packet classifier a plurality of entries to be matched by the incoming RoCE packets, the plurality of entries including a respective entry for each of the at least two RoCE versions for each supported Base Transport Header (BTH) opcode of the incoming RoCE packets.

Example 6 provides the method according to Example 1, where programming the IG flow table includes creating an IG flow table entry for the connection identified by the first QP ID and ensuring that, when an incoming RoCE packet for the connection identified by the first QP ID matches the IG flow table entry, the incoming RoCE packet is decapsulated according to the RoCE version indicated for the connection identified by the first QP ID.

Example 7 provides the method according to Example 6, where, when the RoCE version indicated for the connection identified by the first QP ID is a RoCE version 1 (v1) version, the IG flow table entry includes the first QP ID, a filter ID obtained from the IG packet classifier, a Logical Interface (LIF) identification (ID) identifying a network interface on the host compute node, a Layer 2 (L2) address of the target compute node, a Maximum Segment Size (MSS) configured for the connection identified by the first QP ID, and RoCE V1 specific microcode to be executed on an IG packet processor of the host VIC adapter for decapsulating the incoming RoCE v1 packet; and, when the RoCE version indicated for the connection identified by the first QP ID is a RoCE version 2 (v2) version, the IG flow table entry includes the first QP ID, the filter ID obtained from the IG packet classifier, the LIF ID identifying the network interface on the host compute node, the L2 address of the target compute node, the MSS configured for the connection identified by the first QP ID, a Layer 3 (L3) address of the host compute node, an L3 address of the target compute node, and RoCE V2 specific microcode to be executed on the IG packet processor of the host VIC adapter for decapsulating the incoming RoCE v2 packet.

Example 8 provides the method according to any one of the preceding Examples, further including selecting the RoCE version to be used for the RDMA connection, during the connection setup, based on an exchange of messages between the host compute node and the target compute node.

Example 9 provides the method according to any one of the preceding Examples, where the at least two RoCE versions include a RoCE version 1 (v1) version and a RoCE version 2 (v2) version, the RoCE v2 including a RoCE v2 with IPv6.

Example 10 provides the method according to any one of the preceding Examples, where each compute node includes one or more hardware processors, and/or implements one or more virtual machines.

Example 11 provides a computer program configured to implement the method according to any one of the preceding Examples.

Example 12 provides a system comprising means for implementing the method according to any one of the preceding Examples.

Example 13 provides a system for simultaneously supporting, on a host VIC adapter of a host compute node, RDMA transport according to at least two RoCE versions, the system including at least one memory element configured to store computer executable instructions, and at least one processor coupled to the at least one memory element and configured, when executing the instructions, to carry out the method according to any one of the preceding Examples.

Example 14 provides one or more non-transitory tangible media encoding logic that include instructions for execution that, when executed by a processor, are operable to perform operations for simultaneously supporting, on a host VIC adapter of a host compute node, RDMA transport according to at least two RoCE versions, the operations comprising operations of the method according to any one of the preceding Examples.

Example 15 provides a data structure for assisting implementation of the method according to any one of the preceding Examples.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, the VIC adapter 120, 202 and the VIC host driver 108. In some embodiments, one or more of these features may be implemented in hardware, provided external to these elements, or consolidated in any appropriate manner to achieve the intended functionality. The various network elements (e.g., the VIC adapter 120, 202 and the host driver 108) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the various network elements described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 118, 304) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 114, processor 302, data processor 208, control processor 206, packets processors 216 and 226) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 100 may be applicable to other exchanges or routing protocols. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for simultaneously supporting, on a virtual interface card (VIC) adapter of a host compute node, remove directly memory access (RDMA) transport according to at least two RDMA over Converged Ethernet (RoCE) versions, the method comprising:
   receiving, at the host VIC adaptor, from a host driver of the host compute node, an indication of a RoCE version, out of the at least two RoCE versions, used for an RDMA connection between the host compute node and a target compute node;
   programming an Egress (EG) packet classifier and an EG flow table of the host VIC adapter to enable encapsulation of outgoing RDMA commands for the connection according to the RoCE version indicated for the connection; and
   programming an Ingress (IG) packet classifier and an IG flow table of the host VIC adapter to enable decapsulation of incoming RDMA commands for the according to the RoCE version indicated for the connection.

2. The method according to claim 1, wherein programming the EG packet classifier comprises providing in the EG packet classifier a plurality of entries to be matched by the outgoing RDMA commands, the plurality of entries comprising a respective entry for each of the at least two RoCE versions for each of the outgoing RDMA commands.

3. The method according to claim 1, wherein programming the EG flow table comprises:
   creating an EG flow table entry for the connection and ensuring that, when an outgoing RDMA command for the connection matches the EG flow table entry, the outgoing RDMA command is encapsulated according to the RoCE version indicated for the connection.

4. The method according to claim 3, wherein:
   when the RoCE version indicated for the connection is a RoCE version 1 (v1) version, the EG flow table entry comprises a first Queue Pair (QP) identification (ID) of the connection a filter ID obtained from the EG packet classifier, a Logical Interface (LIF) identification (ID) identifying a network interface on the host compute node, a Layer 2 (L2) address of the target compute node, and a RoCE v1 specific microcode to be executed on an EG packet processor of the host VIC adapter for encapsulating the outgoing RDMA command; and
   when the RoCE version indicated for the connection is a RoCE version 2 (v2) version, the EG flow table entry comprises the first OP ID, the filter ID obtained from the EG packet classifier, the LIF ID identifying the network interface on the host compute node, the L2 address of the target compute node, a Layer 3 (L3) address of the host compute node, an L3 address of the target compute node, and a RoCE v2 specific microcode to be executed on the EG packet processor of the host VIC adapter for encapsulating the outgoing RDMA command.

5. The method according to claim 1, wherein programming the IG packet classifier comprises providing in the IG packet classifier a plurality of entries to be matched by the incoming RoCE packets, the plurality of entries comprising a respective entry for each of the at least two RoCE versions for each supported Base Transport Header (BTH) opcode of the incoming RoCE packets.

6. The method according to claim 1, wherein programming the IG flow table comprises:
   creating an IG flow table entry for the connection and ensuring that, when an incoming RoCE packet for the connection matches the IG flow table entry, the incoming RoCE packet is decapsulated according to the RoCE version indicated for the connection.

7. The method according to claim 6, wherein:
   when the RoCE version indicated for the connection is a RoCE version 1 (v1) version, the IG flow table entry comprises a first QP ID of the connection, a filter ID obtained from the IG packet classifier, a Logical Interface (LIF) identification (ID) identifying a network interface on the host compute node, a Layer 2 (L2) address of the target compute node, a Maximum Segment Size (MSS) configured for the connection identified by the first QP ID, and RoCE V1 specific microcode to be executed on an IG packet processor of the host VIC adapter for decapsulating the incoming RoCE v1 packet; and,
   when the RoCE version indicated for the connection is a RoCE version 2 (v2) version, the IG flow table entry comprises the first QP ID, the filter ID obtained from the IG packet classifier, the LIF ID identifying the network interface on the host compute node, the L2 address of the target compute node, the MSS configured for the connection, a Layer 3 (L3) address of the host compute node, an L3 address of the target compute node, and RoCE V2 specific microcode to be executed on the IG packet processor of the host VIC adapter for decapsulating the incoming RoCE v2 packet.

8. A host virtual interface card (VIC) adapter for simultaneously supporting remote direct memory access (RDMA) transport of a host compute node according to at least two RDMA over Converged Ethernet (RoCE) versions, the VIC adapter comprising:
   at least one memory element configured to store computer executable instructions;
   at least one processor coupled to the at least one memory element and programmed, when executing the instructions, to:

receive, at the host VIC adaptor, from a host driver of the host compute node, an indication of a RoCE version, out of the at least two RoCE versions, used for an RDMA connection between the host compute node and a target compute node;

program an Egress (EG) packet classifier and an EG flow table of the host VIC adapter to enable encapsulation of outgoing RDMA commands for the connection according to the RoCE version indicated for the connection; and program an Ingress (IG) packet classifier and an IG flow table of the host VIC adapter to enable decapsulation of incoming RDMA commands for the according to the RoCE version indicated for the connection.

9. The VIC adapter according to claim 8, wherein programming the EG packet classifier comprises providing in the EG packet classifier a plurality of entries to be matched by the outgoing RDMA commands, the plurality of entries comprising a respective entry for each of the at least two RoCE versions for each of the outgoing RDMA commands.

10. The VIC adapter according to claim 8, wherein programming the EG flow table comprises:

creating an EG flow table entry for the connection and ensuring that, when an outgoing RDMA command for the connection matches the EG flow table entry, the outgoing RDMA command is encapsulated according to the RoCE version indicated for the connection.

11. The VIC adapter according to claim 10, wherein:

when the RoCE version indicated for the connection is a RoCE version 1 (v1) version, the EG flow table entry comprises a first QP ID of the connection, a filter ID obtained from the EG packet classifier, a Logical Interface (LIF) identification (ID) identifying a network interface on the host compute node, a Layer 2 (L2) address of the target compute node, and a RoCE v1 specific microcode to be executed on an EG packet processor of the host VIC adapter for encapsulating the outgoing RDMA command; and when the RoCE version indicated for the connection is a RoCE version 2 (v2) version, the EG flow table entry comprises the first OP ID, the filter ID obtained from the EG packet classifier, the LIF ID identifying the network interface on the host compute node, the L2 address of the target compute node, a Layer 3 (L3) address of the host compute node, an L3 address of the target compute node, and a RoCE v2 specific microcode to be executed on the EG packet processor of the host VIC adapter for encapsulating the outgoing RDMA command.

12. The VIC adapter according to claim 8, wherein programming the IG packet classifier comprises providing in the IG packet classifier a plurality of entries to be matched by the incoming RoCE packets, the plurality of entries comprising a respective entry for each of the at least two RoCE versions for each supported Base Transport Header (BTH) opcode of the incoming RoCE packets.

13. The VIC adapter according to claim 8, wherein programming the IG flow table comprises:

creating an IG flow table entry for the connection and ensuring that, when an incoming RoCE packet for the connection matches the IG flow table entry, the incoming RoCE packet is decapsulated according to the RoCE version indicated for the connection.

14. The VIC adapter according to claim 13, wherein:

when the RoCE version indicated for the connection is a RoCE version 1 (v1) version, the IG flow table entry comprises a first QP ID of the connection, a filter ID obtained from the IG packet classifier, a Logical Interface (LIF) identification (ID) identifying a network interface on the host compute node, a Layer 2 (L2) address of the target compute node, a Maximum Segment Size (MSS) configured for the connection identified by the first QP ID, and RoCE V1 specific microcode to be executed on an IG packet processor of the host VIC adapter for decapsulating the incoming RoCE v1 packet; and, when the RoCE version indicated for the connection is a RoCE version 2 (v2) version, the IG flow table entry comprises the first QP ID, the filter ID obtained from the IG packet classifier, the LIF ID identifying the network interface on the host compute node, the L2 address of the target compute node, the MSS configured for the connection, a Layer 3 (L3) address of the host compute node, an L3 address of the target compute node, and RoCE V2 specific microcode to be executed on the IG packet processor of the host VIC adapter for decapsulating the incoming RoCE v2 packet.

15. One or more non-transitory tangible media encoding logic that include instructions for execution that, when executed by a processor, are operable to perform operations for simultaneously supporting, on a host virtual interface card (VIC) adapter of a host compute node, remote direct memory access (RDMA) transport according to at least two RDMA over Converged Ethernet (RoCE) versions, the operations comprising:

receiving, at the host VIC adaptor, from a host driver of the host compute node, an indication of a RoCE version, out of the at least two RoCE versions, used for an RDMA connection between the host compute node and a target compute node;

programming an Egress (EG) packet classifier and an EG flow table of the host VIC adapter to enable encapsulation of outgoing RDMA commands for the connection according to the RoCE version indicated for the connection; and programming an Ingress (IG) packet classifier and an IG flow table of the host VIC adapter to enable decapsulation of incoming RDMA commands for the according to the RoCE version indicated for the connection.

16. The media according to claim 15, wherein programming the EG packet classifier comprises providing in the EG packet classifier a plurality of entries to be matched by the outgoing RDMA commands, the plurality of entries comprising a respective entry for each of the at least two RoCE versions for each of the outgoing RDMA commands.

17. The media according to claim 15, wherein programming the EG flow table comprises:

creating an EG flow table entry for the connection and ensuring that, when an outgoing RDMA command for the connection matches the EG flow table entry, the outgoing RDMA command is encapsulated according to the RoCE version indicated for the connection.

18. The media according to claim 17, wherein:

when the RoCE version indicated for the connection is a RoCE version 1 (v1) version, the EG flow table entry comprises a first Queue Pair (QP) identification (ID) of the connection a filter ID obtained from the EG packet classifier, a Logical Interface (LIF) identification (ID) identifying a network interface on the host compute node, a Layer 2 (L2) address of the target compute node, and a RoCE v1 specific microcode to be executed on an EG packet processor of the host VIC adapter for encapsulating the outgoing RDMA command; and when the RoCE version indicated for the connection is a RoCE version 2 (v2) version, the EG flow table entry comprises the first OP ID, the filter ID obtained from the EG packet classifier, the LIF ID identifying the network interface on the host compute node, the L2 address of the target compute node, a Layer 3 (L3) address of the host compute node, an L3 address of the target compute node, and a RoCE v2 specific microcode to be executed on the EG packet processor of the host VIC adapter for encapsulating the outgoing RDMA command.

19. The media according to claim 15, wherein programming the IG packet classifier comprises providing in the IG packet classifier a plurality of entries to be matched by the incoming RoCE packets, the plurality of entries comprising a respective entry for each of the at least two RoCE versions for each supported Base Transport Header (BTH) opcode of the incoming RoCE packets.

20. The media according to claim 15, wherein programming the IG flow table comprises:

creating an IG flow table entry for the connection and ensuring that, when an incoming RoCE packet for the connection matches the IG flow table entry, the incoming RoCE packet is decapsulated according to the RoCE version indicated for the connection.

* * * * *